United States Patent
Kawamura

(10) Patent No.: US 7,508,827 B2
(45) Date of Patent: Mar. 24, 2009

(54) MULTICAST ROUTING PROGRAM, MULTICAST ROUTING METHOD, AND MULTICAST ROUTER

(75) Inventor: Naokazu Kawamura, Kawasaki (JP)

(73) Assignee: Fujitsu Limited, Nakahara-Ku, Kawasaki-Shi, Kanagawa (JP)

( * ) Notice: Subject to any disclaimer, the term of this patent is extended or adjusted under 35 U.S.C. 154(b) by 612 days.

(21) Appl. No.: 11/155,521

(22) Filed: Jun. 20, 2005

(65) Prior Publication Data
US 2006/0209826 A1 Sep. 21, 2006

(30) Foreign Application Priority Data
Feb. 18, 2005 (JP) ............... 2005-042577

(51) Int. Cl.
H04L 12/56 (2006.01)
(52) U.S. Cl. .............. 370/390; 370/395.31; 370/432; 709/238; 709/245
(58) Field of Classification Search .......... 370/351, 370/390, 395.3, 432; 709/242, 238, 245
See application file for complete search history.

(56) References Cited

U.S. PATENT DOCUMENTS

| | | | | |
|---|---|---|---|---|
| 5,128,926 A | * | 7/1992 | Perlman et al. | 370/248 |
| 5,687,168 A | * | 11/1997 | Iwata | 370/255 |
| 6,823,395 B1 | * | 11/2004 | Adolfsson | 709/242 |
| 7,277,383 B2 | * | 10/2007 | Choe et al. | 370/219 |
| 7,334,047 B1 | * | 2/2008 | Pillay-Esnault | 709/242 |
| 2002/0001318 A1 | * | 1/2002 | Yoon | 370/524 |

OTHER PUBLICATIONS

Patent Abstracts of Japan, Publication No. 2003-078556, Publication Date Mar. 14, 2003.

* cited by examiner

*Primary Examiner*—Hassan Kizou
*Assistant Examiner*—Emmanuel Maglo
(74) *Attorney, Agent, or Firm*—Fujitsu Patent Center

(57) ABSTRACT

A multicast routing program for allowing multicast data to be transmitted via a different route from a route for unicast data with higher reliability. A state-determining section determines whether all links on a predetermined transmission line to a multicast-transmission terminal device are connected, upon receiving a multicast reception request. If all the links on the predetermined transmission line are connected, a multicast-reception-request transmission section transmits the multicast reception request over the predetermined transmission line. If a link on the predetermined transmission line is disconnected, the multicast reception request is transmitted over a different transmission line. When receiving multicast data from the multicast-transmission terminal device, a multicast-data transfer section transmits multicast data through a communication interface to which the multicast reception request has been input.

15 Claims, 19 Drawing Sheets

111 UNICAST ROUTING TABLE

| TYPE OF ROUTING PROTOCOL | TARGET NETWORK | COST | GATEWAY | ... |
|---|---|---|---|---|
| O | 10.97.0.104/30 | 30 | 10.97.0.86 | ... |
| ⋮ | ⋮ | ⋮ | ⋮ | ⋮ |

FIG. 5

121 MULTICAST ROUTING TABLES

121a

| TRANSMISSION TERMINAL ADDRESS | (10.162.202.1, 239.196.90.1) |
|---|---|
| RECEPTION INTERFACE (Incoming interface) | Vlan153, |
| TRANSMISSION INTERFACE LIST (Outgoing interface list) | Vlan154 |
| ⋮ | ⋮ |

121b

| TRANSMISSION TERMINAL ADDRESS | (*, 239.196.90.1), |
|---|---|
| RECEPTION INTERFACE (Incoming interface) | Null, RPF nbr 0.0.0.0 |
| TRANSMISSION INTERFACE LIST (Outgoing interface list) | Vlan154, Forward/Sparse, 1d00h/00:02:04 |
| ⋮ | ⋮ |

FIG. 7

MULTICAST ROUTING PROGRAM, MULTICAST ROUTING METHOD, AND MULTICAST ROUTER

CROSS-REFERENCE TO RELATED APPLICATIONS

This application is based upon and claims the benefits of priority from the prior Japanese Patent Application No. 2005-042577, filed on Feb. 18, 2005, the entire contents of which are incorporated herein by reference.

BACKGROUND OF THE INVENTION

1. Field of the Invention

The present invention relates to multicast routing programs, multicast routing methods, and multicast routers for routing multicast data. In particular, the present invention relates to a multicast routing program, a multicast routing method, and a multicast router for allowing multicast data to be transmitted over a transmission line different from a transmission line for unicast data.

2. Description of the Related Art

Recent development of the advanced information society has promoted the proliferation of optical fibers all over the nation. With this widespread use of optical fibers, the Internet Protocol (IP) network communication speed has also been increased. These higher communication speeds have brought about new forms of communication based on IP multicast, such as moving-image distribution services and network game applications, in addition to conventional forms of communication including World Wide Web and electronic mail applications.

Several types of IP multicast technologies are currently available. Among others, Protocol Independent Multicast-Sparse Mode (PIM-SM) for efficiently using network traffic is a typical IP multicast technology, which is employed in many IP multicast networks.

FIG. 18 is a diagram depicting a technology for transmitting multicast data by known dynamic routing. A plurality of optical fibers is laid down among routers 901 to 906 (including layer 3 switches). In other words, the routers 901 to 906 are interconnected via a plurality of paths. Connecting the routers via a plurality of paths allows an alternative route to be automatically selected by dynamic routing in the event of a line failure such as a breakage of an optical fiber.

Network segments 910 and 920 are connected to the router 901. A terminal device 911 is connected to the segment 910. A terminal device 921 is connected to the segment 920.

Network segments 930 and 940 are connected to the router 906. A terminal device 931 and a multicast-transmission terminal device 932 are connected to the segment 930. A terminal device 941 and a multicast-transmission terminal device 942 are connected to the segment 940. The multicast-transmission terminal devices 932 and 942 generate and output source data to be multicast.

This network controls data paths by Open Shortest Path First (OSPF). The routers 901 to 906 each acquire segment information by dynamic routing and generate a unicast routing table. The unicast routing tables include a cost of each path among the routers 901 to 906.

A path passing through the routers 901, 902, 904, and 906 has a cost of "1" between adjacent routers. A path passing through the routers 901, 903, 905, and 906 has a cost of "10" between adjacent routers. The routers 901 to 906 carry out data routing by selecting a path with a lower cost.

It is assumed that unicast communication is carried out between the terminal device 911 and the terminal device 931. Unicast data 951 is transmitted and received through a path with a lower cost. Therefore, the unicast data 951 is transmitted and received via the path over the routers 901, 902, 904, and 906.

A procedure for transmitting multicast data by the PIM-SM technology will be described next. This example assumes that multicast data 953 is distributed from the multicast-transmission terminal device 932 to the terminal device 911.

To enable the terminal device 911 to receive the multicast data 953 from the multicast-transmission terminal device 932, the terminal device 911 transmits to the router 901 a multicast reception request (join message) 952 bound for the unicast address of the multicast-transmission terminal device 932. The multicast reception request 952 is periodically transmitted by the terminal device 911.

When the router 901 has received the multicast reception request 952, it refers to the unicast routing table to select the path with the lowest cost from among the paths connected to the multicast-transmission terminal device 932 and then transmits the multicast reception request 952 to the adjacent router 902 on the selected path.

This operation of transmitting the multicast reception request 952 is sequentially repeated at the routers on the path up to the router 906 connected to the segment 930, including the multicast-transmission terminal device 932. When the router 906 receives the multicast reception request 952, it outputs the multicast data 953 through the communication interface that has received the multicast reception request 952. The routers 904, 902, and 901 also transfer the multicast data 953. As a result, the multicast data 953 is transmitted to the terminal device 911, which has transmitted the multicast reception request 952.

When the multicast data 953 is distributed by the PIM-SM technology in this manner, the multicast data 953 output from the multicast-transmission terminal device 932 in the segment 930 and the unicast data 951 output from the terminal device 931 in the segment 930 are transmitted to the terminal device 911 over the same path.

In dynamic routing, a data reception path is automatically switched in the event of a line failure or other problems. Also in this case, multicast data and unicast data are transferred along the same path.

Instead of transmitting a multicast reception request along unicast routing, a destination to which the multicast reception request is transmitted can be statically preset.

FIG. 19 is a diagram depicting a technology for transmitting multicast data by known static routing. In a network shown in FIG. 19, the routers 901 to 906 on the network shown in FIG. 18 are replaced with routers 961 to 966, respectively, for performing static routing. The transfer of unicast data 971 is carried out according to the unicast routing tables in the same manner as in FIG. 18.

A multicast reception request 972 (join message) is statically preset in the routers 961 to 966. In the case of FIG. 19, in the router 961, the transfer destination of the multicast reception request 972 specifying the multicast address of the multicast-transmission terminal device 932 is set to the router 963. Similarly, in the router 963, the transfer destination of the multicast reception request 972 specifying the multicast address of the multicast-transmission terminal device 932 is set to the router 965. In the router 965, the transfer destination of the multicast reception request 972 specifying the multicast address of the multicast-transmission terminal device 932 is set to the router 966.

When the multicast reception request 972 specifying the multicast address of the multicast-transmission terminal device 932 is output from the terminal device 911, the multicast reception request 972 is passed to the router 961. The router 961 transmits the multicast reception request 972 to the router 963 according to the static setting. At this time, no reference is made to the unicast routing table. Subsequently, the multicast reception request 972 is transferred from the router 963 to the router 965 and further from the router 965 to the router 966.

When the router 966, which has received multicast data 973 from the multicast-transmission terminal device 932, receives the multicast reception request 972 from the router 965, the router 966 transmits the multicast data 973 to the line over which the multicast reception request 972 has been received. When the routers 965, 963, and 961 receive the multicast data 973, they also transmit the multicast data 973 to the line over which the multicast reception request 972 has been received.

Consequently, the multicast data 973 is transmitted to the terminal device 911. The multicast reception request 972 is periodically transmitted from the terminal device 911.

A network relay device for selecting an optimal path according to the type of transmission data and forwarding reception data to the selected path is also disclosed (for example, see Japanese Unexamined Patent Publication No. 2003-78556).

However, multicast data transferred by dynamic routing always goes over the same path as that for unicast data. More specifically, when a router transfers a multicast reception request output from a terminal device, the router searches the unicast routing table for the unicast address of the multicast-transmission terminal device and transmits the multicast reception request through the shortest path. This transmission path for the multicast reception request is the same as that for unicast data. The multicast data goes in the reverse direction over the path taken by the multicast reception request. This means that the multicast data and the unicast data always use the same line.

For this reason, multicast data and unicast data cannot be distributed via different routes.

On the other hand, static multicast routing allows multicast data and unicast data to be distributed via different routes. In this case, however, the multicast data cannot be automatically diverted to the line for unicast data in the event of a failure on the line set for static multicast routing. Therefore, network reliability deteriorates.

Japanese Unexamined Patent Publication No. 2003-78556 also discloses a technology for carrying out path selection according to the protocol of communication data. In this technology, however, the transmission line for multicast data is determined depending on the transmission line taken by a multicast reception request output from a terminal device. Therefore, once the multicast reception request has been transmitted over the same path as that for unicast data, it is difficult to transmit multicast data output from the multicast-transmission terminal device via a route different from that for the unicast data even if the path selection technology described in Japanese Unexamined Patent Publication No. 2003-78556 is applied to the multicast data.

Multicast data can be prevented from being output to irrelevant routes by transferring the multicast data in the reverse direction over the path taken by the multicast reception request. This processing is necessary to make communication efficient. Thus, if a technology disclosed in Japanese Unexamined Patent Publication No. 2003-78556 is used, regardless of the path taken by the multicast reception request, to distribute unicast data and multicast data via different routes, the multicast data is transmitted to irrelevant routes. This means that it is difficult to apply the technology, described in Japanese Unexamined Patent Publication No. 2003-78556, directly to unicast data and multicast data to be distributed via different routes.

SUMMARY OF THE INVENTION

In view of the foregoing, it is an object of the present invention to provide a multicast routing program, a multicast routing method, and a multicast router for allowing multicast data to be transmitted via a different route from a route for unicast data with higher reliability.

To accomplish the above object, according to the present invention, there is provided a multicast routing program for routing multicast data. This multicast routing program for routing multicast data causes a computer to function as: a link-managing unit for monitoring a state of a link between devices connected to a network to set state information in a link state table, the state information indicating whether the link is in a connection state or a disconnection state; a predetermined-transmission-line managing unit for referring to the link state table to set transmission-line-state information in a predetermined-transmission-line managing table including a predetermined transmission line leading to a multicast-transmission terminal device for distributing multicast data, the transmission-line-state information indicating whether or not all links on the predetermined transmission line are in a connection state; a state-determining unit for referring to the predetermined-transmission-line managing table to determine whether or not all the links on the predetermined transmission line leading to the multicast-transmission terminal device are connected, upon receiving a multicast reception request specifying the multicast-transmission terminal device; a multicast-reception-request transmitting unit for transmitting the multicast reception request to an adjacent router on the predetermined transmission line if all the links on the predetermined transmission line are connected, and for selecting one transmission line on which all links leading to the multicast-transmission terminal device are connected to transmit the multicast reception request through the selected transmission line if a link is disconnected on the predetermined transmission line; and a multicast-data transferring unit for registering identification information of a communication interface to which the multicast reception request is input, in a multicast routing table and, upon receiving multicast data output from the multicast-transmission-terminal device, for referring to the multicast routing table to transmit the multicast data from the communication interface to which the multicast reception request is input.

To accomplish the above object, according to the present invention, there is provided a multicast routing method for routing multicast data using a computer. This multicast routing method for routing multicast data using a computer includes the following steps: causing a link-managing unit to monitor a state of a link between devices connected to a network to set state information in a link state table, the state information indicating whether the link is in a connection state or a disconnection state; causing a predetermined-transmission-line managing unit to refer to the link state table to set transmission-line-state information in a predetermined-transmission-line managing table including a predetermined transmission line leading to a multicast-transmission terminal device for distributing multicast data, the transmission-line-state information indicating whether or not all links on the predetermined transmission line are in a connection state;

causing a state-determining unit to refer to the predetermined-transmission-line managing table to determine whether or not all the links on the predetermined transmission line leading to the multicast-transmission terminal device are connected, upon receiving a multicast reception request specifying the multicast-transmission terminal device; causing a multicast-reception-request transmitting unit to transmit the multicast reception request to an adjacent router on the predetermined transmission line if all the links on the predetermined transmission line are connected, and to select one transmission line on which all links leading to the multicast-transmission terminal device are connected to transmit the multicast reception request through the selected transmission line if a link is disconnected on the predetermined transmission line; and causing a multicast-data transferring unit to register identification information of a communication interface to which the multicast reception request is input, in a multicast routing table and, upon receiving multicast data output from the multicast-transmission terminal device, to refer to the multicast routing table to transmit the multicast data from the communication interface to which the multicast reception request is input.

To accomplish the above object, according to the present invention, there is provided a multicast router for routing multicast data. This multicast router for routing multicast data includes the following elements: a link-managing unit for monitoring a state of a link between devices connected to a network to set state information in a link state table, the state information indicating whether the link is in a connection state or a disconnection state; a predetermined-transmission-line managing unit for referring to the link state table to set transmission-line-state information in a predetermined-transmission-line managing table including a predetermined transmission line leading to a multicast-transmission terminal device for distributing multicast data, the transmission-line-state information indicating whether or not all links on the predetermined transmission line are in a connection state; a state-determining unit for referring to the predetermined-transmission-line managing table to determine whether or not all the links on the predetermined transmission line leading to the multicast-transmission terminal device are connected, upon receiving a multicast reception request specifying the multicast-transmission terminal device; a multicast-reception-request transmitting unit for transmitting the multicast reception request to an adjacent router on the predetermined transmission line if all the links on the predetermined transmission line are connected, and for selecting one transmission line on which all links leading to the multicast-transmission terminal device are connected to transmit the multicast reception request through the selected transmission line if a link is disconnected on the predetermined transmission line; and a multicast-data transferring unit for registering identification information of a communication interface to which the multicast reception request is input, in a multicast routing table and, upon receiving multicast data output from the multicast-transmission terminal device, for referring to the multicast routing table to transmit the multicast data from the communication interface to which the multicast reception request is input.

To accomplish the above object, according to the present invention, there is provided a computer-readable recording medium having stored the above-described multicast routing program for routing multicast data.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram depicting an example data structure of a unicast routing table.

FIG. 7 is a diagram depicting an example data structure of multicast routing tables.

DESCRIPTION OF THE PREFERRED EMBODIMENTS

An embodiment according to the present invention will now be described with reference to the drawings. All "routers" described in the embodiment according to the present invention are assumed to be multicast routers capable of routing multicast data. Routers may be referred to as servers.

Figure 1:
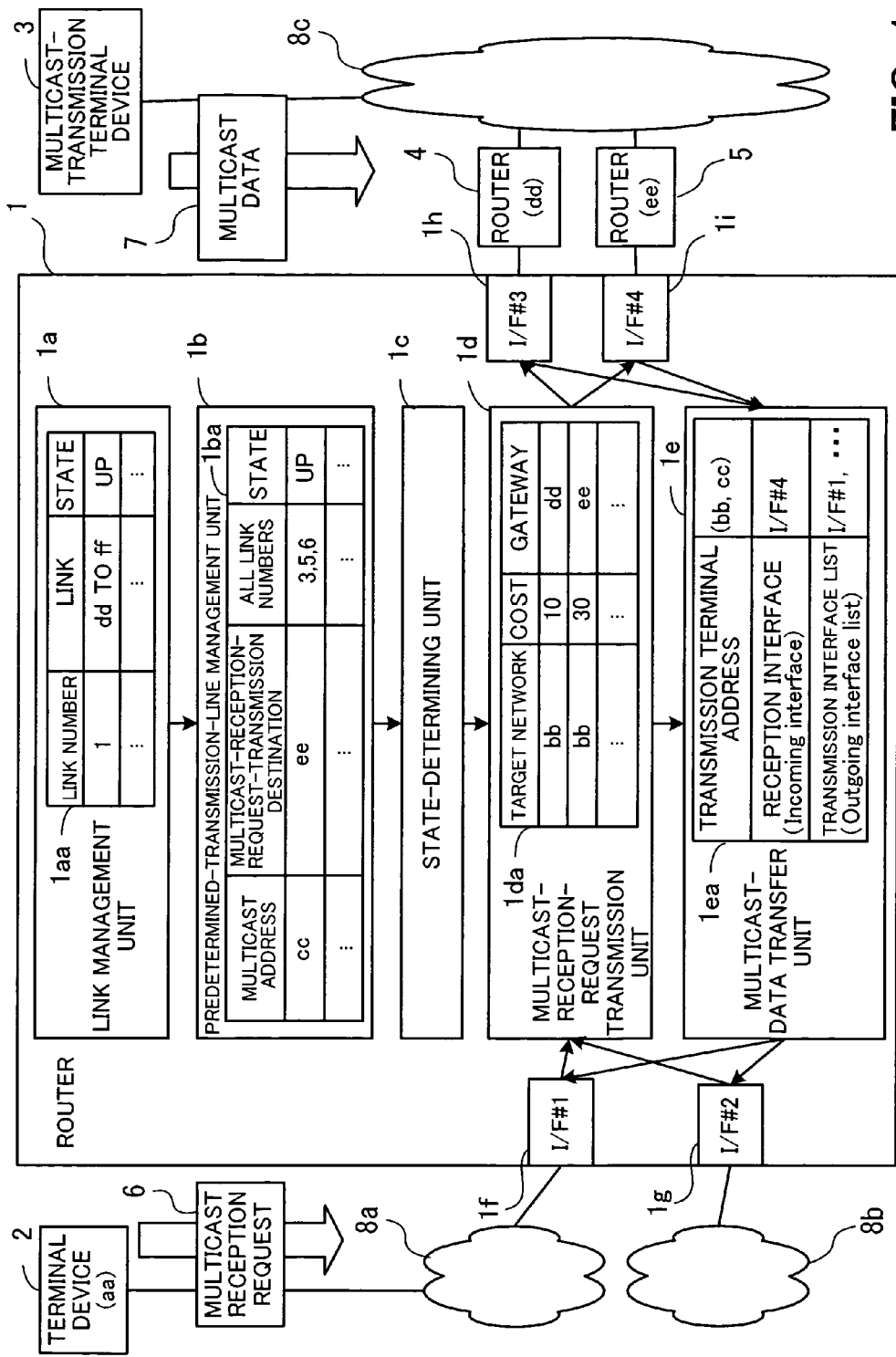
FIG. 1 is a diagram depicting an outline of an embodiment.

FIG. 1 is a diagram depicting an outline of the present embodiment. A router 1 for routing multicast data 7 is connected to a terminal device 2 (address "aa") through a network 8a. The router 1 is also connected to other terminal devices (not shown) through the network 8a and a network 8b. Furthermore, the router 1 is connected to a network 8c through other routers 4 and 5 (addresses "dd" and "ee", respectively). A multicast-transmission terminal device 3 (unicast address "bb" and multicast address "cc") is connected to the network 8c.

The terminal device 2 is a computer used by a user. When the terminal device 2 is to receive the multicast data 7 distributed by the multicast-transmission terminal device 3, the terminal device 2 periodically (every 30 seconds, for example) outputs a multicast reception request 6 bound for the multicast-transmission terminal device 3. In the multicast reception request 6, the unicast address "bb" of the multicast-transmission terminal device 3 is specified as the address of the transmission destination. The multicast reception request 6 also includes the multicast address "cc" of the multicast-transmission terminal device 3.

The multicast-transmission terminal device 3 transmits the multicast data 7 through the network 8c.

The routers 1, 4, and 5 transfer the multicast reception request 6 output from the terminal device 2 to the multicast-transmission terminal device 3. For this purpose, when all links on a predetermined transmission line are connected, each of the routers 1, 4, and 5 transfers the multicast reception request 6 to its adjacent router on the predetermined transmission line. Furthermore, if there is a broken link on the predetermined transmission line, each of the routers 1, 4, and 5 transfers the multicast reception request 6 to its adjacent router on a transmission line different from the predetermined transmission line. In addition, the routers 1, 4, and 5 transfer the multicast data 7 in the opposite direction over the transmission line taken by the multicast reception request 6.

To relay data between different networks, the router 1 includes a plurality of communication interfaces: 1f, 1g, 1h, and 1i (with identification numbers "I/F#1", "I/F#2", "I/F#3", and "I/F#4", respectively). Furthermore, to transfer the multicast reception request 6 and the multicast data 7, the router 1 includes processing functions shown in FIG. 1. The other routers 4 and 5 include the same functions as the router 1. The functions of the router 1 are described below.

A link management unit 1a monitors the state of the link between each pair of adjacent devices connected to a network to set in a link state table 1aa state information indicating whether the link (communication state on the network layer) between each pair of adjacent devices is in a connection state or a disconnection state. In the link state table 1aa, a link state between each pair of adjacent devices is registered, for example, in association with a link number for uniquely identifying the link. The link state is indicated with, for example, "UP" for a connection state and "DOWN" for a disconnection state.

The link management unit 1a is capable of recognizing the state of each link, for example, by checking a response to a ping command. The link management unit 1a can also recognize the state of each link in cooperation with an OSPF database.

A predetermined-transmission-line management unit 1b includes a predetermined-transmission-line management table 1ba which contains information about the predetermined transmission line up to the multicast-transmission terminal device 3 that distributes multicast data. By referring to the link state table 1aa, the predetermined-transmission-line management unit 1b sets in the predetermined-transmission-line management table 1ba transmission-line-state information indicating whether or not all links on the predetermined transmission line are in a connection state. In the predetermined-transmission-line management table 1ba, a predetermined transmission line used to transfer a multicast reception request is defined with link numbers (all link numbers) of the links specifying the predetermined transmission line, in association with, for example, the multicast address ("cc" in the example of FIG. 1) of the multicast-transmission terminal device 3.

In the predetermined-transmission-line management table 1ba, the address (multicast-reception-request-transmission destination) of an adjacent router on the predetermined transmission line is also registered in association with the multicast address. In the example of FIG. 1, the predetermined transmission line up to the multicast-transmission terminal device 3 (multicast address "cc") is defined as the line via the router 5 (address "ee"), and therefore, the address of the router 5 is registered as the multicast-reception-request-transmission destination.

In the predetermined-transmission-line management table 1ba, the "UP" state is set if all links on the predetermined transmission line are connected. In the predetermined-transmission-line management table 1ba, the "DOWN" state is set if at least one link on the predetermined transmission line is disconnected.

When a state-determining unit 1c receives the multicast reception request 6 specifying the multicast-transmission terminal device 3, the state-determining unit 1c refers to the predetermined-transmission-line management table 1ba to determine whether all links on the predetermined transmission line leading to the multicast-transmission terminal device 3 are connected. In other words, the state-determining unit 1c searches the predetermined-transmission-line management table 1ba for a record associated with the multicast address "cc" of the multicast-transmission terminal device 3 serving as the destination of the multicast reception request 6. The state-determining unit 1c determines the state of the transmission line depending on whether the detected record indicates "UP" or "DOWN".

If all links on the predetermined transmission line are connected, a multicast-reception-request transmission unit 1d transmits the multicast reception request 6 to an adjacent router on the transmission line. In contrast, if there is a broken link on the predetermined transmission line, the multicast-reception-request transmission unit 1d selects one of transmission lines on which all links leading to the multicast-transmission terminal device 3 are connected and transmits the multicast reception request 6 to the selected transmission line.

If there is a broken link on the predetermined transmission line, the multicast-reception-request transmission unit 1d can refer to, for example, a unicast routing table 1da to select a transmission line.

In the example of FIG. 1, in the unicast routing table 1da, the cost of every transmission line and the address (gateway) of an adjacent router are registered in association with the unicast address "bb" (target network) of the multicast-transmission terminal device 3 serving as the destination. In this case, the multicast-reception-request transmission unit 1d refers to the unicast routing table 1da to select the transmission line with the lowest cost from among the transmission lines associated with the unicast address "bb" of the multicast-transmission terminal device 3. The multicast-reception-request transmission unit 1d transmits the multicast reception request 6 to the adjacent router (the router 4 with address "dd" in the example of FIG. 1) on the selected transmission line.

A multicast-data transfer unit 1e registers in a multicast routing table 1ea the identification information of the communication interface to which the multicast reception request 6 has been input. For example, a set of transmission terminal addresses (the unicast address and multicast address of the multicast-transmission terminal device 3), a reception interface (the identification number of the communication interface from which the multicast reception request 6 has been output), and a transmission interface list (a list of communication interfaces through which multicast reception requests bound for the multicast-transmission terminal device 3 have been input) are registered in the multicast routing table 1ea.

Furthermore, when the multicast data 7 output from the multicast-transmission terminal device 3 is received, the multicast-data transfer unit 1e refers to the multicast routing table 1ea to transmit the multicast data 7 from the communication interface 1f to which the multicast reception request 6 has been input. More specifically, when the multicast data 7 input through the reception interface described in the multicast routing table 1ea is originated from the multicast-transmission terminal device 3 indicated with the transmission terminal addresses, the multicast-data transfer unit 1e outputs the multicast data 7 from the communication interface listed in the transmission interface list.

According to the router 1, the link management unit 1a monitors the state of the link between each pair of adjacent devices connected to a network to set in the link state table 1aa state information indicating whether the link between each pair of adjacent devices is in a connection state or a disconnection state. Furthermore, the predetermined-transmission-line management unit 1b refers to the link state table 1aa and sets transmission-line-state information indicating whether or not all links on the predetermined transmission line are in a connection state in the predetermined-transmission-line management table 1ba which contains information about the predetermined transmission line up to the multicast-transmission terminal device 3.

When the multicast reception request 6 specifying the multicast-transmission terminal device 3 is received, the state-determining unit 1c refers to the predetermined-transmission-line management table 1ba to determine whether or not all links on the predetermined transmission line leading to the multicast-transmission terminal device 3 are connected. When all links on the predetermined transmission line are connected, the multicast-reception-request transmission unit 1d transmits the multicast reception request 6 to the adjacent router on the predetermined transmission line. If there is a broken link on the predetermined transmission line, the multicast-reception-request transmission unit 1d selects one of the transmission lines on which all links leading to the multicast-transmission terminal device 3 are connected and transmits the multicast reception request 6 to the selected transmission line. Then, the multicast-data transfer unit 1e registers in the multicast routing table 1ea the identification information of the communication interface through which the multicast reception request 6 has been input.

The multicast reception request 6 is periodically output from the terminal device 2. Thus, if a failure on a network causes the predetermined transmission line to be disconnected, a subsequently output multicast reception request 6 is transferred to a transmission line different from the predetermined transmission line. As a result, an entry (reception interface) in the multicast routing table 1ea of the multicast-data transfer unit 1e is also changed.

When the multicast data 7 output from the multicast-transmission terminal device 3 is received, the multicast-data transfer unit 1e refers to the multicast routing table 1ea and transmits the multicast data 7 from the communication interface 1f through which the multicast reception request 6 has been input.

As described above, when the predetermined transmission line is normally connected, the multicast reception request 6 is transferred over the predetermined transmission line, whereas, if a failure occurs on the predetermined transmission line, the multicast reception request 6 is transferred over another transmission line. Since the predetermined transmission line can be predefined as desired, the multicast data 7 can be transferred over a transmission line different from that for unicast data, if there is no failure on the predetermined transmission line. Furthermore, in the event of a failure occurring on the predetermined transmission line, the transmission line for multicast data can be dynamically changed (an alternative route is automatically selected in the event of a line failure). As a result, reliability is enhanced when multicast data is transferred over a transmission line different from that for unicast data.

The embodiment according to the present invention will be described in detail.

Figure 2:
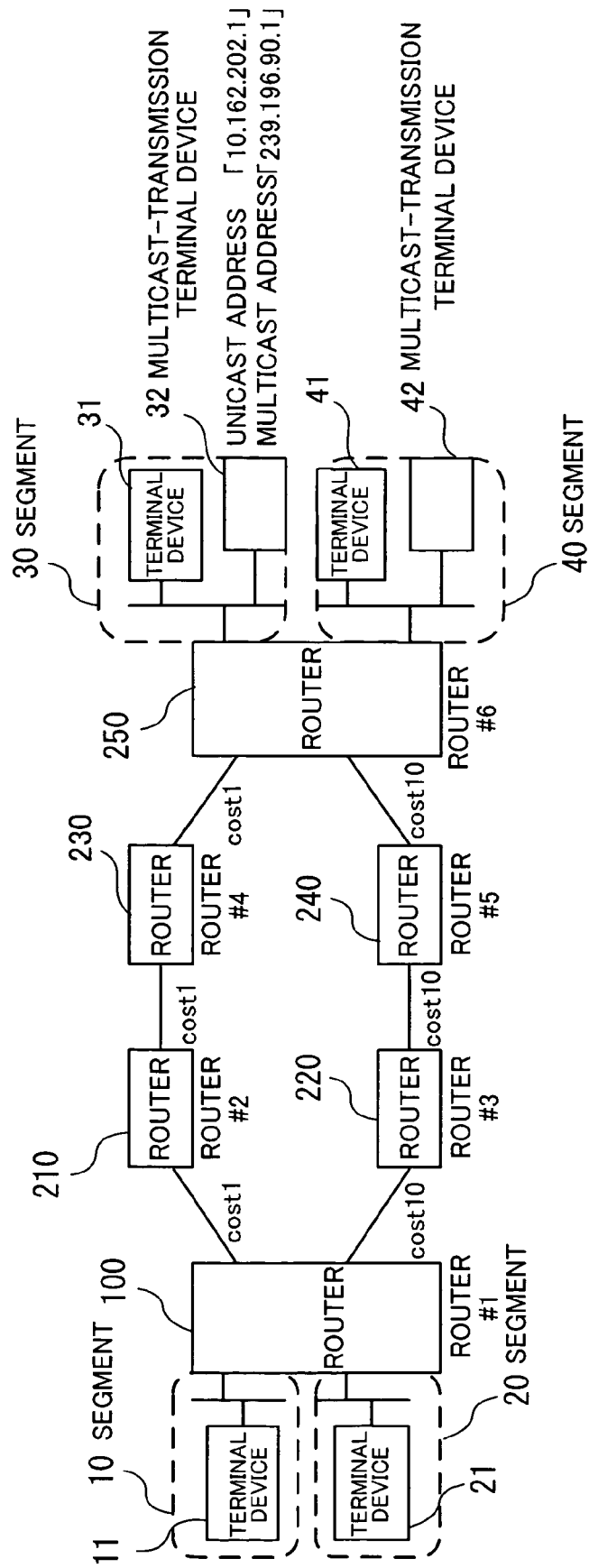
FIG. 2 is a diagram depicting an example structure of a system according to the embodiment of the present invention.

FIG. 2 is a diagram depicting an example structure of a system according to the embodiment of the present invention. Routers 100, 210, 220, 230, 240, and 250 (including layer 3 switches) are interconnected with optical fibers. More specifically, the router 100 is connected to the router 210 and the router 220. The router 210 is connected to the router 230. The router 220 is connected to the router 240. The router 230 and router 240 are connected to the router 250. Thus, the router 100 and the router 250 are interconnected via a plurality of paths. Connecting the routers 100, 210, 220, 230, 240, and 250 via a plurality of paths allows an alternative route to be automatically selected by dynamic routing in the event of a line failure such as a breakage of an optical fiber.

Network segments 10 and 20 are connected to the router 100. A terminal device 11 is connected to the segment 10. A terminal device 21 is connected to the segment 20.

Network segments 30 and 40 are connected to the router 250. A terminal device 31 and a multicast-transmission terminal device 32 are connected to the segment 30. A terminal device 41 and a multicast-transmission terminal device 42 are connected to the segment 40.

The multicast-transmission terminal devices 32 and 42 generate and output source data to be multicast. For example, monitor cameras with a network interface are used as the multicast-transmission terminal devices 32 and 42. Installing many monitor cameras connected to a network along a river allows video images acquired with the monitor cameras to be broadcast in real time. In this manner, the river can be monitored on the terminal devices 11 and 21 connected to the network.

Each of the multicast-transmission terminal devices 32 and 42 has a multicast address and a unicast address. The multicast address is used as the address of the transmission source when multicast data is transmitted. The unicast address is used to transmit and receive unicast data. In this example, it is assumed that the unicast address of the multicast-transmission terminal device 32 is "10.162.202.1" and that the multicast address of the multicast-transmission terminal device 32 is "239.196.90.1".

The routers 100, 210, 220, 230, 240, and 250 control data paths by OSPF. Each of the routers 100, 210, 220, 230, 240, and 250 acquires segment information by dynamic routing to construct a unicast routing table. The costs of communication via paths connected to the routers 100, 210, 220, 230, 240, and 250 are set in the unicast routing tables.

The cost of the path between the router 100 and the router 210 is "1". The cost of the path between the router 210 and the router 230 is "1". The cost of the path between the router 230 and the router 240 is "1". The cost of the path between the router 100 and the router 220 is "10". The cost of the path between the router 220 and the router 240 is "10". The cost of the path between the router 240 and the router 250 is "10". The routers 100, 210, 220, 230, 240, and 250 carry out data routing by selecting a path with a lower cost.

In addition, each of the routers 100, 210, 220, 230, 240, and 250 has an identification number (an IP address, for example). The identification number of the router 100 is "router #1". The identification number of the router 210 is "router #2".

The identification number of the router 220 is "router #3".
The identification number of the router 230 is "router #4".
The identification number of the router 240 is "router #5".
The identification number of the router 250 is "router #6".

Figure 3:
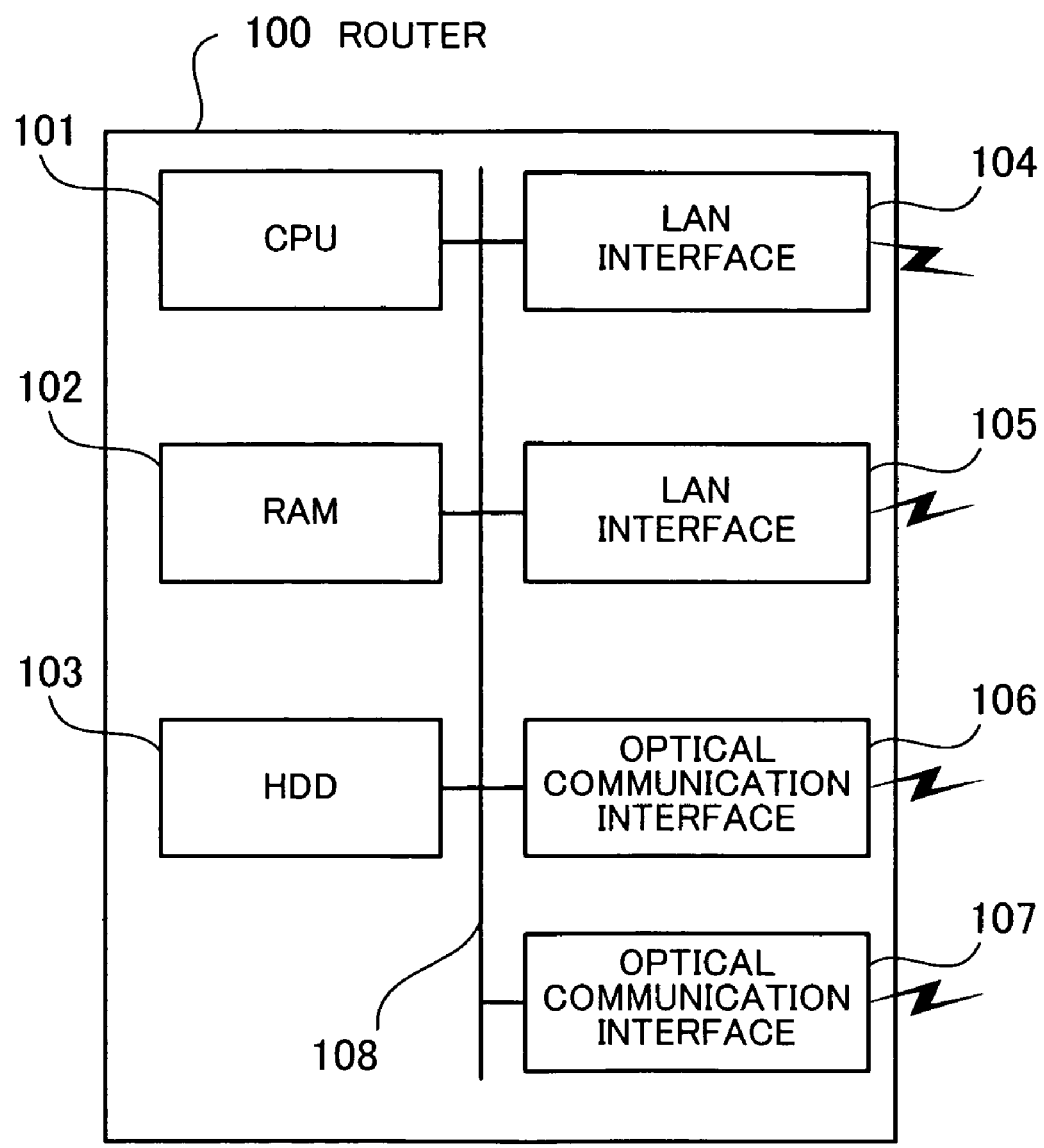
FIG. 3 is a diagram depicting an example hardware structure of a server used in the embodiment.

FIG. 3 is a diagram depicting an example hardware structure of a server used in the present embodiment. The router 100 is controlled by a central processing unit (CPU) 101. A random access memory (RAM) 102, a hard disk drive (HDD) 103, LAN interfaces 104 and 105, and optical communication interfaces 106 and 107 are connected to the CPU 101 through a bus 108.

At least a part of an operating system (OS) program and application program to be executed by the CPU 101 is temporarily stored in the RAM 102. Various types of data required for processing by the CPU 101 are also stored in the RAM 102. The OS and application programs are stored in the HDD 103.

The LAN interface 104 is connected to the segment 10. The LAN interface 104 transmits and receives data to and from the terminal device 11 through the segment 10.

The LAN interface 105 is connected to the segment 20. The LAN interface 105 transmits and receives data to and from the terminal device 21 through the segment 20.

The optical communication interface 106 is connected to the router 210 through an optical fiber. The optical communication interface 106 transmits and receives data to and from the router 210.

The optical communication interface 107 is connected to the router 220 through an optical fiber. The optical communication interface 107 transmits and receives data to and from the router 220.

With the above-described hardware structure, the processing functions according to the present embodiment can be realized. FIG. 3 shows an example hardware structure of the router 100. The routers 210, 220, 230, 240, and 250 can also be realized with the same hardware as that shown in FIG. 3.

Figure 4:
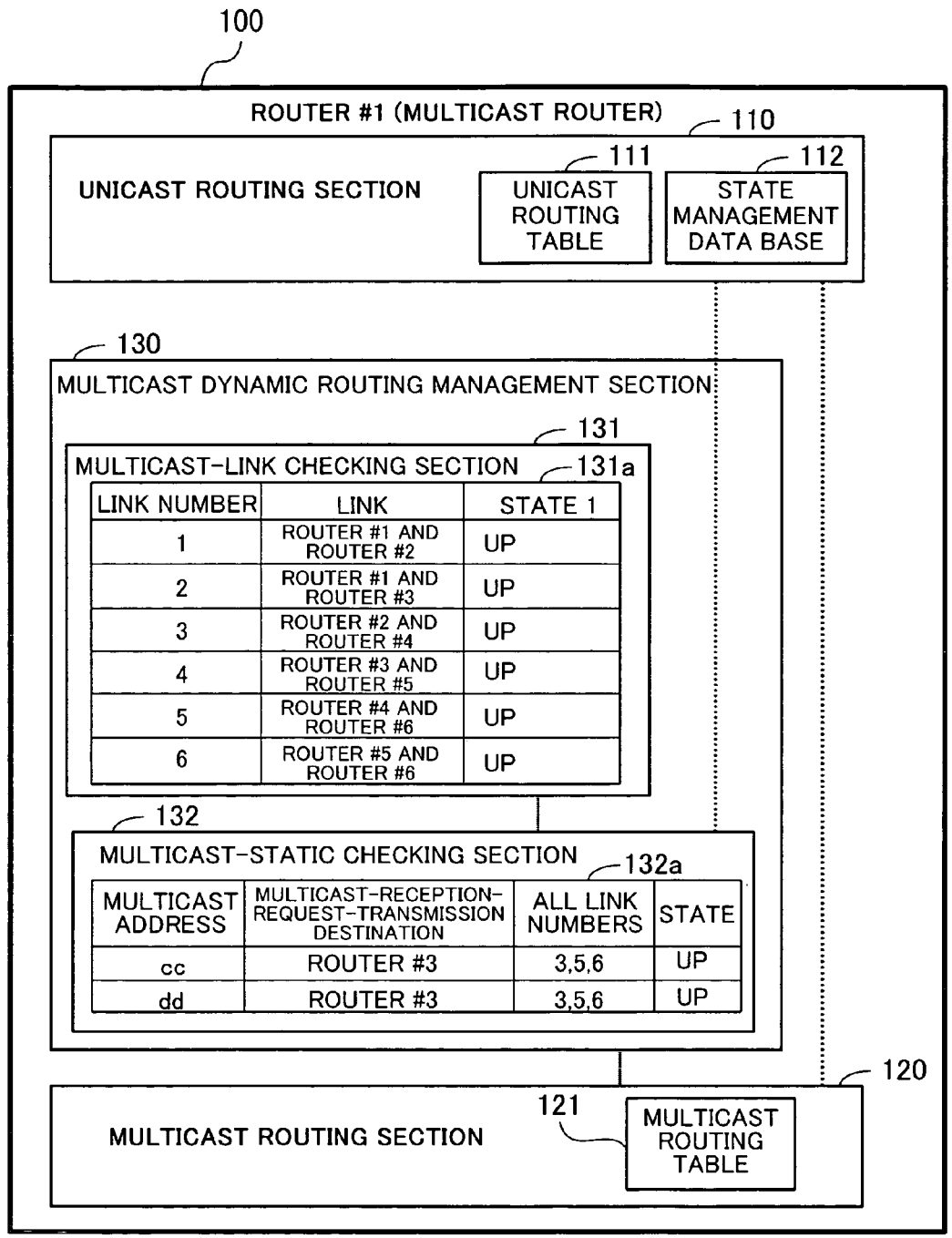
FIG. 4 is a block diagram depicting functions of the server.

FIG. 4 is a block diagram depicting functions of a server. The router 100 includes a unicast routing section 110, a multicast routing section 120, and a multicast dynamic routing management section 130.

The unicast routing section 110 carries out routing of unicast data. The unicast routing section 110 includes a unicast routing table 111 and a state management database (DB) 112. The unicast routing table 111 includes information such as the relationship between the destination of unicast data and an adjacent router on the transmission line leading to the destination. The state management DB 112 includes information indicating whether a link with another router is established.

The multicast routing section 120 carries out routing of multicast data. The multicast routing section 120 includes multicast routing tables 121. Each of the multicast routing tables 121 includes information such as the relationship between the multicast addresses and unicast addresses of a multicast-transmission terminal device for distributing multicast data.

The multicast dynamic routing management section 130 dynamically controls transmission paths of multicast data. The multicast dynamic routing management section 130 includes a multicast-link checking section 131 and a multicast-static checking section 132.

The multicast-link checking section 131 includes a link state table 131a for managing link states. The state of the link between each pair of adjacent routers through which a multicast reception request (join message) passes is registered in the multicast-link checking section 131.

The link state table 131a includes three columns: "Link number", "Link", and "State". The data items horizontally adjacent to each other in the table constitute the record of each link.

The identification number of each link is registered in the "Link number" column. The identification numbers of the routers connected to both ends of each link are registered in the "Link" column. Whether the link is connected or disconnected is indicated with "UP" or "DOWN" in the "State" column.

The "State" column of the link state table 131a is updated by the multicast-link checking section 131 as required. More specifically, the multicast-link checking section 131 periodically checks the state of the link between each pair of adjacent servers, and based on the check result, updates the "Link" column of the link state table 131a. A typical method for checking the link state is to see the response to a ping command issued to the optical communication interface of a target router. In the case of dynamic routing by OSPF, it is also possible to check the link state in conjunction with the state management DB 112 of OSPF.

The multicast-static checking section 132 includes a static route management table 132a for registering the transmission destination of a multicast reception request (join message) to manage whether or not all links leading to the relevant multicast address are in the UP state.

The static route management table 132a includes four columns: "Multicast address", "Multicast-reception-request-transmission destination", "All link numbers", and "State". The data items horizontally adjacent to each other in the table constitute the record of each transmission line.

The multicast addresses of the multicast-transmission terminal devices 32 and 42 for transmitting multicast data are registered in the "Multicast address" column. The identification numbers of adjacent routers on a transmission line up to the multicast-transmission terminal devices 32 and 42 are registered in the "Multicast-reception-request-transmission destination" column. The identification numbers of all routers existing on the transmission line up to the multicast-transmission terminal devices 32 and 42 are registered in the "All link numbers" column. Information about the "UP" or "DOWN" state indicating whether the transmission line up to the multicast-transmission terminal devices 32 and 42 is communicable is registered in the "State" column.

The unicast routing table ill, the state management DB 112, and the multicast routing tables 121 will be described in detail with reference to FIGS. 5 to 7.

FIG. 5 is a diagram depicting an example data structure of the unicast routing table 111. The unicast routing table 111 includes columns: "Routing protocol type", "Target network", "Cost", "Gateway", and others. Data items horizontally adjacent to each other in the table constitute the record of each unicast transmission destination.

The routing protocol of unicast data is set in the "Routing protocol type" column. In this example, "O" is registered when the routing program is OSPF, and "R" is registered when the routing protocol is Routing information protocol (RIP).

The IP address and the sub-network address of the data destination are registered in the "Target network" column.

The cost required to reach the terminal device serving as the data destination is registered in the "Cost" column. This registered cost is the sum of the costs associated with the links constituting the transmission line up to the device serving as the destination.

The IP address of an adjacent router on the transmission line up to the device serving as the destination is registered in the "Gateway" column.

Figure 6:
FIG. 6 is a diagram depicting an example data structure of a state management data base.

FIG. 6 is a diagram depicting an example data structure of the state management DB 112. The state management DB 112 includes columns: "Link ID", "ADV router", "Age", and others. Data items horizontally adjacent to each other in the table constitute the management information record of each segment.

Identification information about the segment serving as the data destination is registered in the "Link ID" column. The IP address of the router that has reported management information is registered in the "ADV router" column. The time that elapsed since the registration of the record is registered in the "Age" column.

Records related to segments having effective communication pathways are registered in the state management DB 112. In other words, the multicast-static checking section 132 determines that a link to a segment registered in the state management DB 112 is in the UP state and that a link to a segment not registered in the state management DB 112 is in the DOWN state.

FIG. 7 is a diagram depicting an example data structure of the multicast routing tables 121. The multicast routing tables 121 include multicast routing tables 121a, 121b, and so on, each corresponding to a multicast-transmission terminal device.

Each of the multicast routing tables 121a, 121b, and so on includes columns: "Transmission terminal address", "Reception interface" (Incoming interface), and "Transmission interface list" (Outgoing interface list). A pair of the unicast address and the multicast address of a multicast-transmission terminal device is registered in the "Transmission terminal address" column. The left entry in a parenthesis is the unicast address and the right entry in the parenthesis is the multicast address. In some cases, symbol "★" is registered in place of the unicast address. This symbol means that a rendezvous point is the transmission destination of multicast data.

A rendezvous point is a router functioning as the root of one distribution tree shared by a plurality of multicast groups in order to route multicast data.

The identification number of the interface (LAN interface or optical communication interface), in the server 100, that receives multicast data is registered in the "Reception interface" column. The identification number of at least one interface, in the server 100, that transmits multicast data is registered in the "Transmission interface list" column.

Processing carried out by the multicast-link checking section 131 and the multicast-static checking section 132 will now be described in detail.

Figure 8:
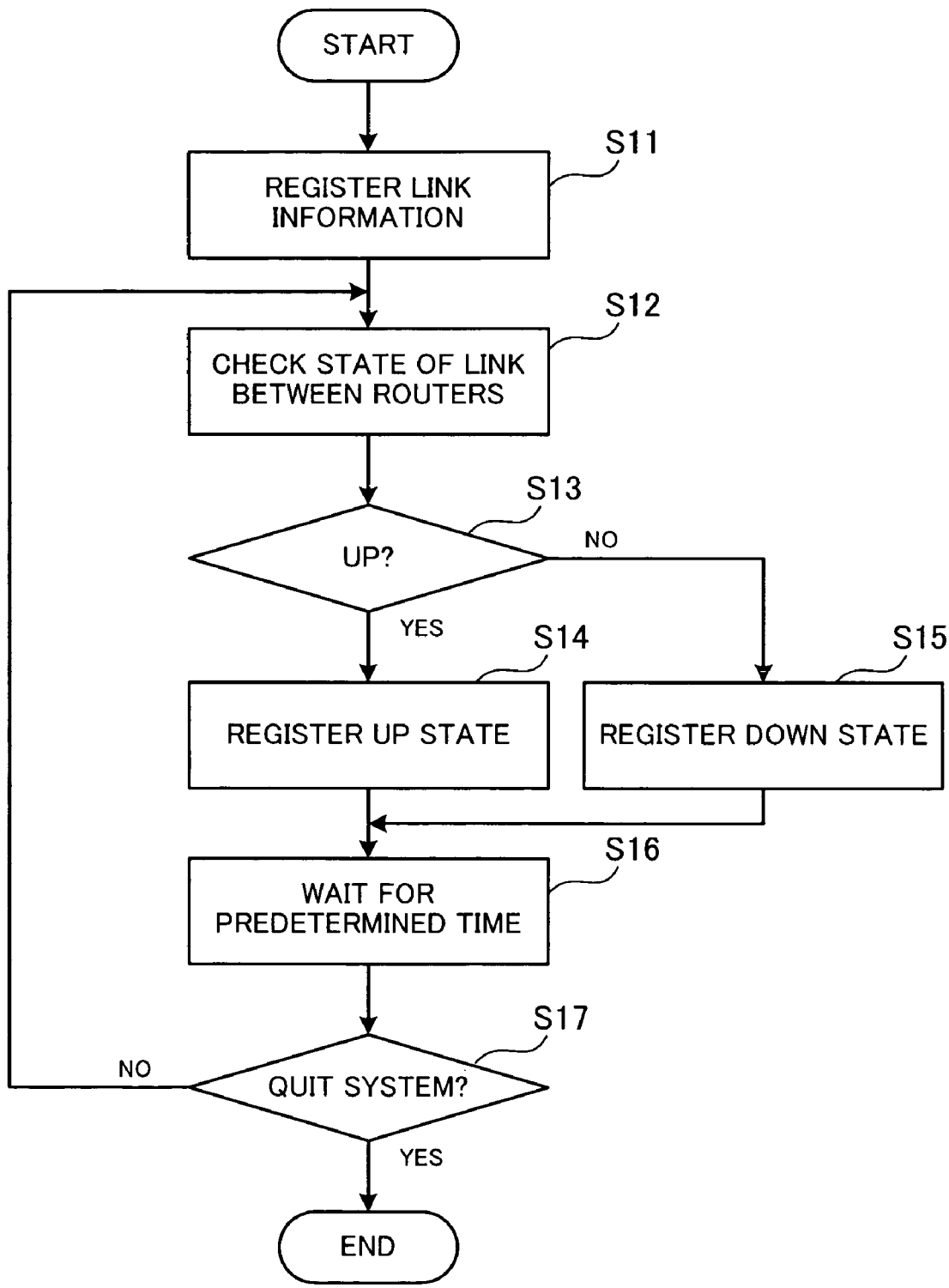
FIG. 8 is a flowchart illustrating a processing procedure for state registration performed by a multicast-link checking section.

FIG. 8 is a flowchart illustrating a processing procedure for state registration performed by the multicast-link checking section 131. The processing shown in FIG. 8 is described in the order of step number.

In step S11, when a new link relationship is recognized, the multicast-link checking section 131 registers link information in the link state table 131a. For example, the multicast-link checking section 131 can recognize a new link relationship by referring to the state management DB 112 of the unicast routing section 110 and detecting information about a newly registered link.

In step S12, based on the registered link information, the multicast-link checking section 131 checks the state of the link between routers. For example, the multicast-link checking section 131 can check the link state when it refers to the state management DB 112 of the unicast routing section 110.

In step S13, the multicast-link checking section 131 determines whether the state of the link between routers is UP. If the link state is UP, the processing proceeds to step S14. If the link state is DOWN, the processing proceeds to step S15.

In step S14, the multicast-link checking section 131 registers "UP" in the "State" column of the corresponding link in the link state table 131a. Then, the processing proceeds to step S16.

In step S15, the multicast-link checking section 131 registers "DOWN" in the "State" column of the corresponding link in the link state table 131a.

In step S16, the multicast-link checking section 131 waits for a predetermined period of time and then advances the processing to step S17.

In step S17, when a command for quitting the processing by the system is detected, the multicast-link checking section 131 quits the processing. If no command for quitting the processing by the system is detected, the processing returns to step S12, where the link state checking and the state update processing are repeated.

In this fashion, the link state can be updated periodically.

Figure 9:
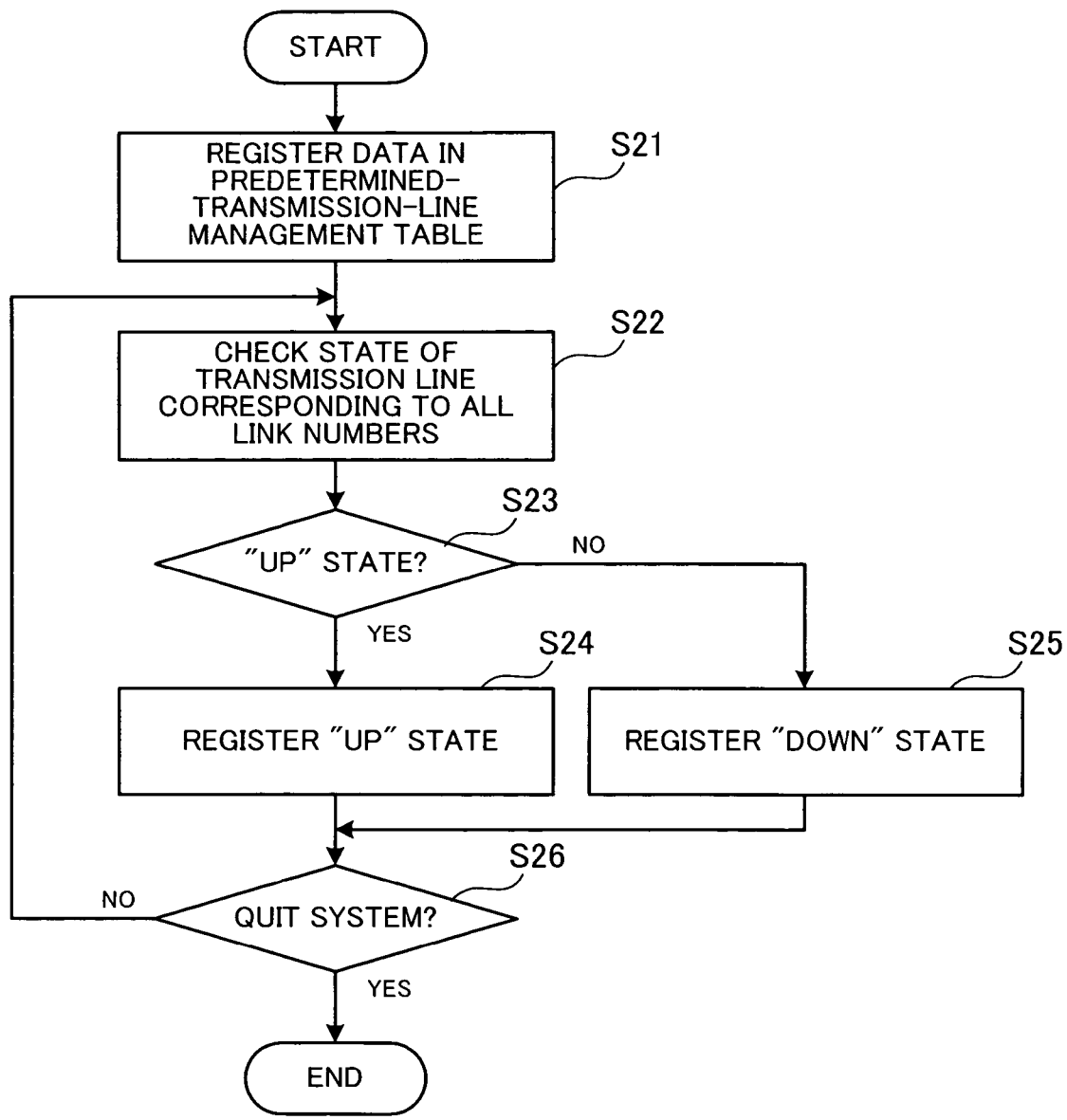
FIG. 9 is a flowchart illustrating a processing procedure for state registration performed by a multicast-static checking section.

FIG. 9 is a flowchart illustrating a processing procedure for state registration performed by the multicast-static checking section 132. The processing shown in FIG. 9 is described in the order of step number.

In step S21, the multicast-static checking section 132 registers a new record in the static route management table 132a. More specifically, the multicast-static checking section 132 registers information about a new multicast-transmission terminal device in the columns: "Multicast address", "Multicast-reception-request-transmission destination", and "All link numbers".

In step S22, the multicast-static checking section 132 checks the states of all registered link numbers. More specifically, the multicast-static checking section 132 inquires of the multicast-link checking section 131 about the states of all the registered link numbers to acquire a response indicating the states (UP or DOWN) of all links on the transmission line.

In step S23, the multicast-static checking section 132 determines whether the states of all the links are "UP". If all the link states are "UP", the processing proceeds to step S24. If at least one link indicates the "DOWN" state, the processing proceeds to step S25.

In step S24, the multicast-static checking section 132 registers "UP" in the record of the static route management table 132a to indicate the state of the transmission line. Then, the processing proceeds to step S26.

In step S25, the multicast-static checking section 132 registers "DOWN" in the record of the static route management table 132a to indicate the state of the transmission line.

In step S26, when a command for quitting the processing by the system is detected, the multicast-static checking section 132 quits the processing. If no command for quitting the processing by the system is detected, the processing returns to step S22 and the link state checking and state update processing are repeated.

In this fashion, the state of the transmission line can be periodically updated.

A processing procedure performed by the server 100 that has received a multicast reception request will now be described.

Figure 10:
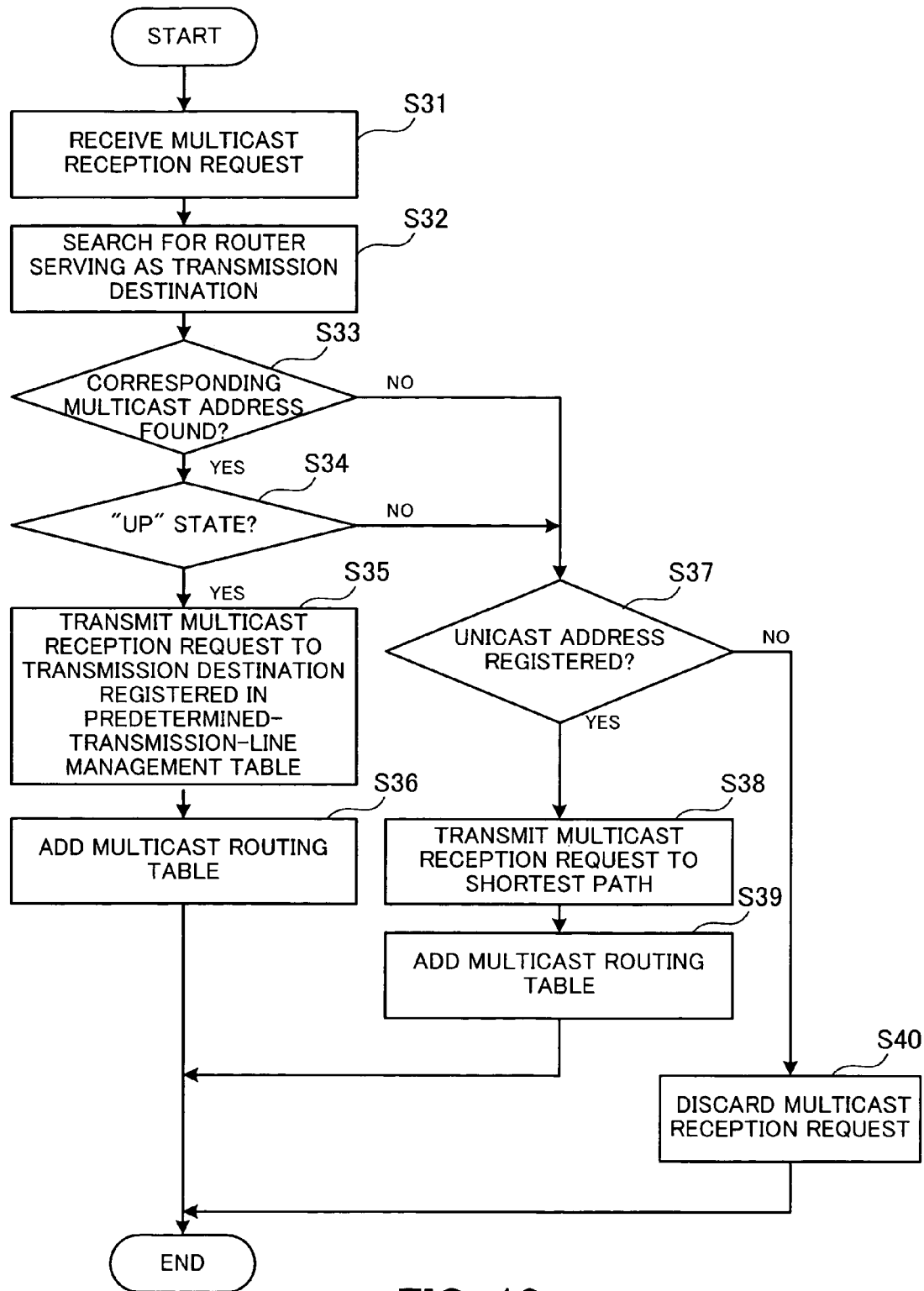
FIG. 10 is a flowchart illustrating a processing procedure followed in response to a multicast reception request.

FIG. 10 is a flowchart illustrating a processing procedure followed in response to a multicast reception request. The processing shown in FIG. 10 will be described in the order of step number. The processing described below is initiated when a multicast reception request is acquired.

In step S31, when the router 100 receives a multicast reception request, the multicast routing section 120 adds a multicast routing table corresponding to the transmission destination of the multicast reception request to the multicast routing tables 121.

In step S32, the multicast-static checking section 132 searches for the adjacent router serving as the transmission destination of the multicast reception request. More specifically, the multicast-static checking section 132 searches the "Multicast address" column of the static route management table 132a for the multicast address indicated by the multicast reception request to acquire the corresponding multicast-reception-request-transmission destination.

In step S33, the multicast-static checking section 132 determines whether or not the multicast address indicated by the multicast reception request is registered in the static route management table 132a. When the multicast address has been registered, the processing proceeds to step S34. If the multicast address is not registered, the processing proceeds to step S37.

In step S34, the multicast-static checking section 132 determines whether or not the state of the record corresponding to the multicast address indicated by the multicast reception request is "UP". If the state is "UP", the processing proceeds to step S35. If the state is "DOWN", the processing proceeds to step S37.

In step S35, the multicast-static checking section 132 passes the multicast-reception-request-transmission destination acquired in step S32 to the multicast routing section 120. In response, the multicast routing section 120 transmits the data of the multicast reception request to the received multicast-reception-request-transmission destination.

In step S36, the multicast routing section 120 generates a multicast routing table corresponding to the multicast reception request and adds it to the multicast routing tables 121. Then, the processing ends.

In step S37, the multicast-static checking section 132 informs the multicast routing section 120 that the static route management table 132a contains no static route capable of multicasting. In response, the multicast routing section 120 inquires of the unicast routing section 110 whether or not the unicast routing table 111 contains the unicast address (the unicast address of the multicast-transmission terminal device) indicated by the multicast reception request. When the unicast address has been registered, the processing proceeds to step S38. If the unicast address is not registered, the processing proceeds to step S40.

In step S38, the multicast routing section 120 acquires from the unicast routing section 110 the information (the IP address of the adjacent server) about the gateway registered in the record indicating the minimum cost (representing the shortest path) from among the records associated with the unicast addresses indicated by the multicast reception request. The multicast routing section 120 then transmits the data of the multicast reception request to the acquired IP address.

In step S39, the multicast routing section 120 generates a multicast routing table corresponding to the multicast reception request and adds it to the multicast routing tables 121. Thereafter, the processing ends.

In step S40, the multicast routing section 120 discards the received multicast reception request. Thereafter, the processing ends.

As described above, the multicast dynamic routing management section 130 operating in conjunction with the multicast routing section 120 realizes distribution of multicast data and unicast data via different routes and automatic selection of an alternative route (dynamic routing).

Examples of transmission and reception of unicast data and multicast data in a network according to the present embodiment will now be described. The following examples assume that unicast data is exchanged between the terminal devices 11 and 31 and between the terminal devices 21 and 41, and that multicast data is transmitted from the multicast-transmission terminal device 32 to the terminal device 11 and from the multicast-transmission terminal device 42 to the terminal device 21.

Figure 11:
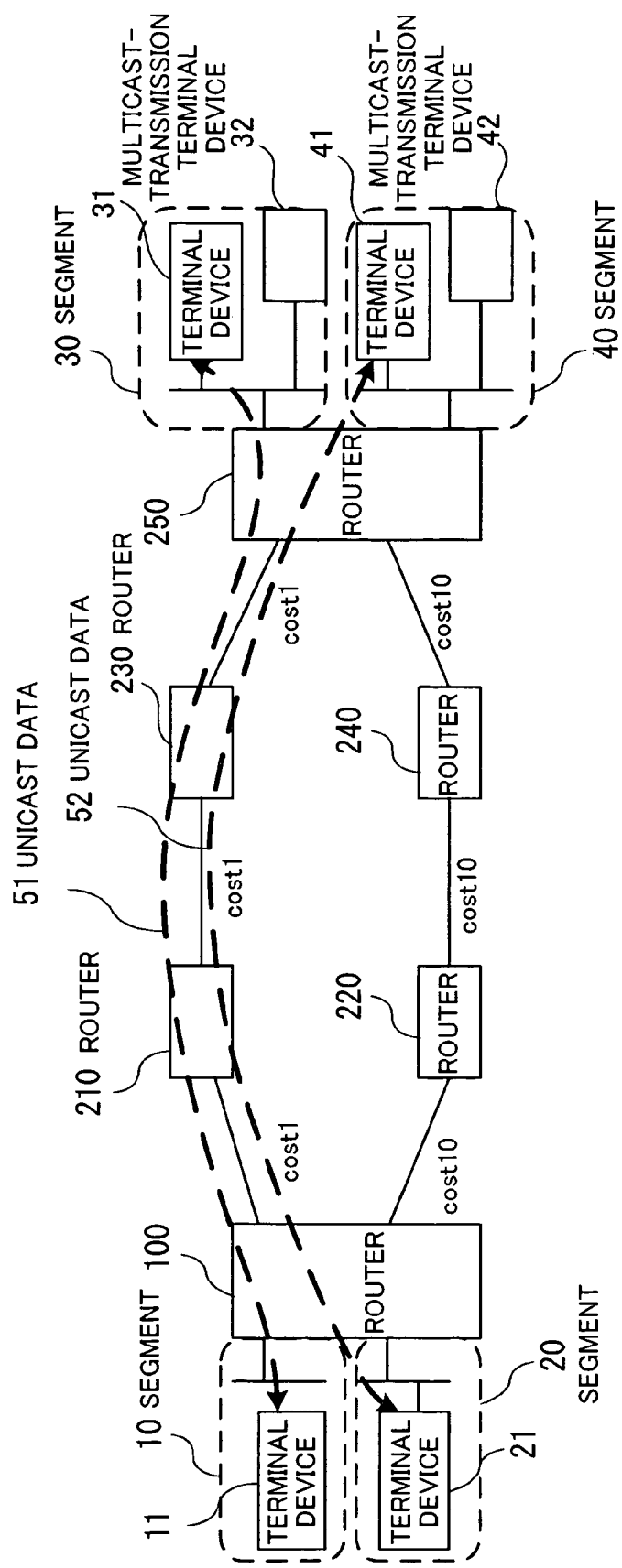
FIG. 11 is a diagram depicting the transmission of unicast data.

FIG. 11 is a diagram depicting the transmission of unicast data. Unicast data 51 and 52 are transmitted and received via a transmission line with a lower cost. According to the present embodiment, the cost between each pair of adjacent routers along the transmission line over the routers 100, 210, 230, and 250 is "1". On the other hand, the cost between each pair of the adjacent routers along the transmission line over the routers 100, 220, 240, and 250 is "10".

Therefore, unicast data 51 between the terminal devices 11 and 31 goes over the transmission line via the routers 100, 210, 230, and 250. Similarly, unicast data 52 between the terminal devices 21 and 41 goes over the transmission line via the routers 100, 210, 230, and 250.

If multicast data distributed by the multicast-transmission terminal device 32 is to be acquired at the terminal device 11, a multicast reception request bound for the multicast-transmission terminal device 32 is transmitted from the terminal device 11. In the multicast reception request, the unicast address of the multicast-transmission terminal device 32 is specified as the data destination, and the multicast address of the multicast-transmission terminal device 32 is included as data information.

Similarly, if multicast data distributed by the multicast-transmission terminal device 42 is to be acquired at the terminal device 21, a multicast reception request bound for the multicast-transmission terminal device 42 is transmitted from the terminal device 21. In the multicast reception request, the unicast address of the multicast-transmission terminal device 42 is specified as the data destination, and the multicast address of the multicast-transmission terminal device 42 is included as data information.

Figure 12:
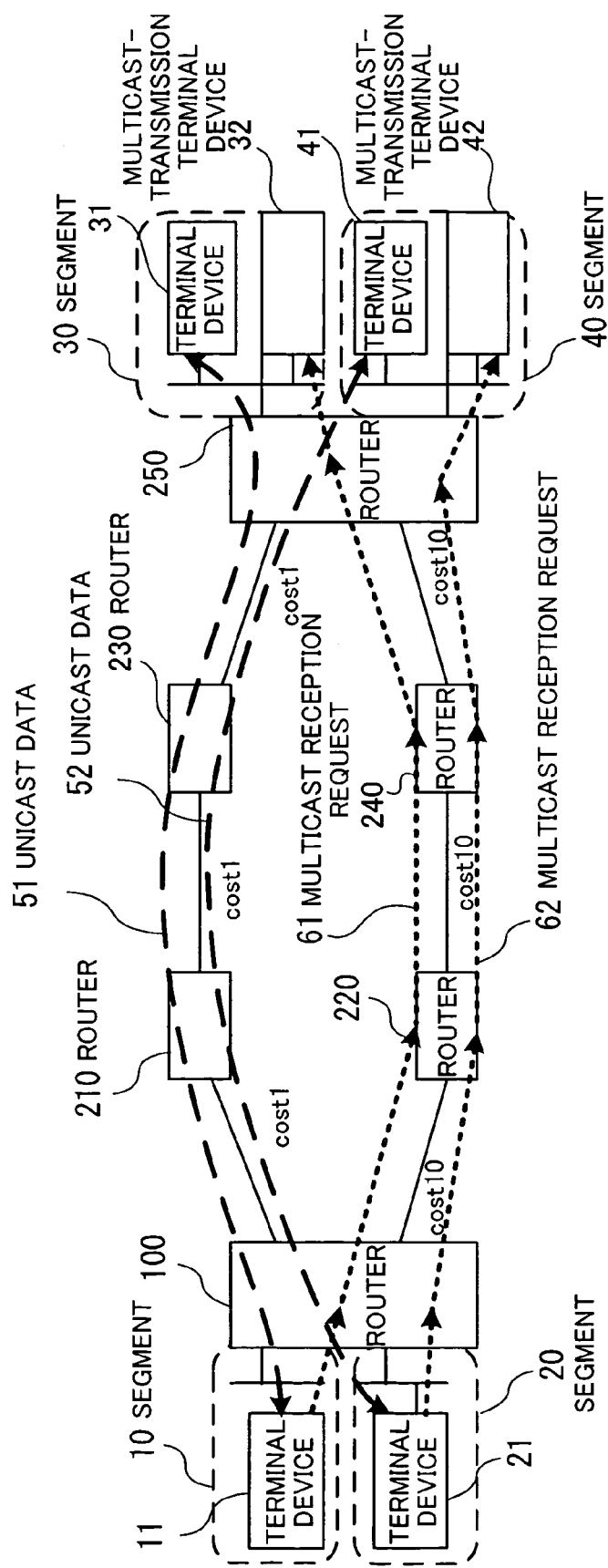
FIG. 12 is a diagram depicting transmission paths for multicast reception requests.

FIG. 12 is a diagram depicting transmission paths for multicast reception requests. The transmission line to be taken by a multicast reception request output from each of the terminal devices 11 and 21 is determined based on the multicast reception request transfer destination registered in the static route management table preset in each of the routers 100, 210, 220, 230, 240, and 250. The multicast reception requests output from the terminal devices 11 and 21 are sent to the multicast-transmission terminal devices 32 and 42 over the transmission line determined as described above.

In this example, in the router 100, the IP address of the router 220 is set as the multicast reception request transfer destination. In the router 220, the IP address of the router 240 is set as the multicast reception request transfer destination. In the router 240, the IP address of the router 250 is set as the multicast reception request transfer destination.

In the router 100, the record corresponding to the multicast address specified by the received multicast reception request is acquired from the static route management table 132a to confirm that the state of the transmission line is "UP". In the example of FIG. 12, since the state of the transmission line is "UP", the server 100 transmits the multicast reception request to the router 220 serving as the multicast-reception-request-transmission destination registered in association with the multicast address. Thereafter, the routers 220, 240, and 250 relay the multicast reception request in the same manner.

Consequently, a multicast reception request 61 output from the terminal device 11 is passed to the multicast-transmission terminal device 32 via the routers 100, 220, 240, and 250. Similarly, a multicast reception request 62 output from the terminal device 21 is passed to the multicast-transmission terminal device 42 via the routers 100, 220, 240, and 250.

In the routers 100, 220, 240, and 250, which have relayed the multicast reception requests 61 and 62, a multicast routing table corresponding to each of the multicast reception requests 61 and 62 is stored in the respective multicast routing sections. The multicast routing tables corresponding to the multicast reception requests 61 and 62 include the addresses (the unicast address and multicast address) of the respective multicast-transmission terminal devices 32 and 42 serving as the destinations of the multicast reception requests 61 and 62, respective reception interfaces, and respective transmission interface lists.

Thereafter, the multicast data output from the multicast-transmission terminal devices 32 and 42 goes to the terminal devices 11 and 21 in the opposite direction over the transmission line taken by the multicast reception requests 61 and 62.

Figure 13:
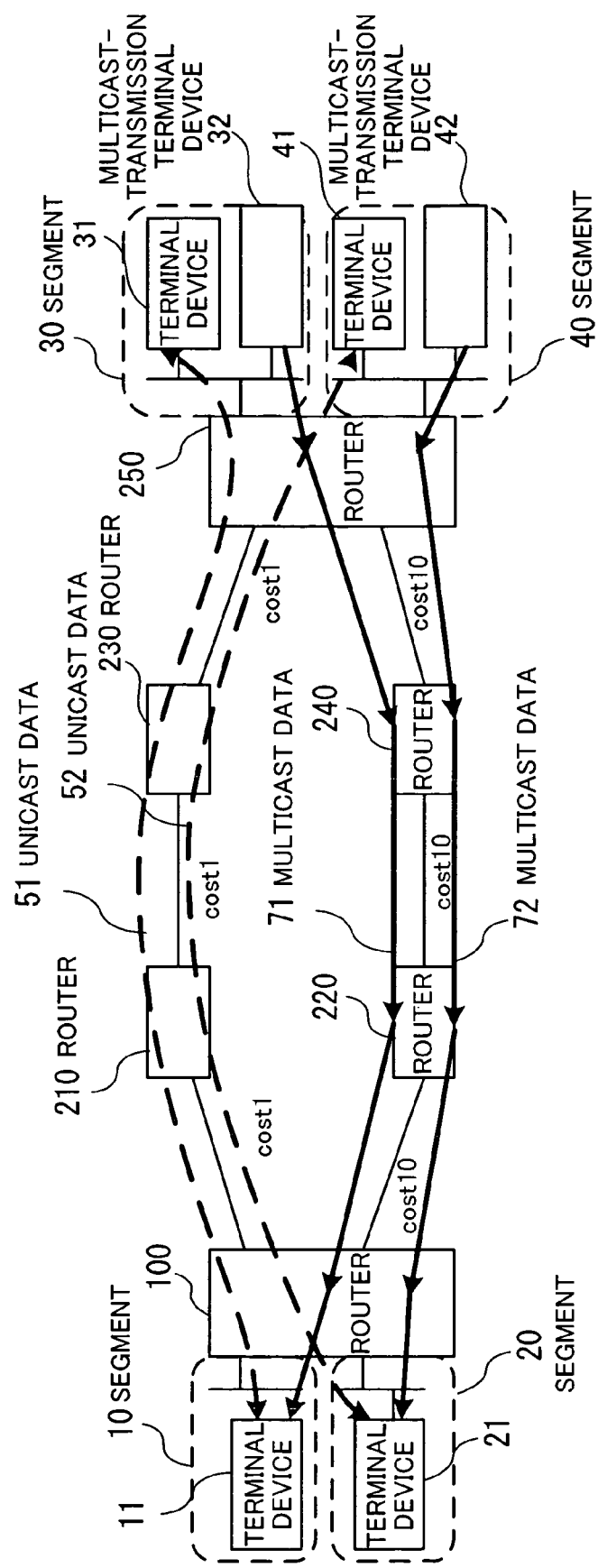
FIG. 13 is a diagram depicting a transmission line for multicast data.

FIG. 13 is a diagram depicting a transmission line for multicast data. Multicast data 71 output from the multicast-transmission terminal device 32 is input to the router 250. In the router 250, a transmission interface list is acquired by referring to the multicast routing table corresponding to the multicast address of the multicast-transmission terminal device 32. Then, the router 250 outputs the multicast data 71 from an interface (optical communication interface or LAN interface)

included in the transmission interface list. Multicast data 72 output from the multicast-transmission terminal device 42 is also handled similarly.

In this manner, the multicast data 71 and multicast data 72 are passed from the router 250 to the router 240. Thereafter, the multicast data 71 and 72 are sequentially transferred to the router 220 and then to the router 100 in the same manner. The multicast data 71 output from the multicast-transmission terminal device 32 is transmitted from the server 100 to the terminal device 11, and the multicast data 72 output from the multicast-transmission terminal device 42 is transmitted from the server 100 to the terminal device 21.

As described above, the multicast data 71 and 72 can be transmitted over a transmission line different from that for the unicast data 51 and 52.

It is assumed that a line failure occurs on the optical fiber between the router 220 and the router 240, causing the link between the routers 220 and 240 to break. Under this assumption, multicast reception requests periodically output from the terminal devices 11 and 21 cannot be transmitted over the transmission line shown in FIG. 13. To address this problem, in the router 100, which has acquired a multicast reception request from each of the terminal devices 11 and 21, a search is made for a different transmission line from the transmission line registered in the static route management table 132*a*.

Figure 14:
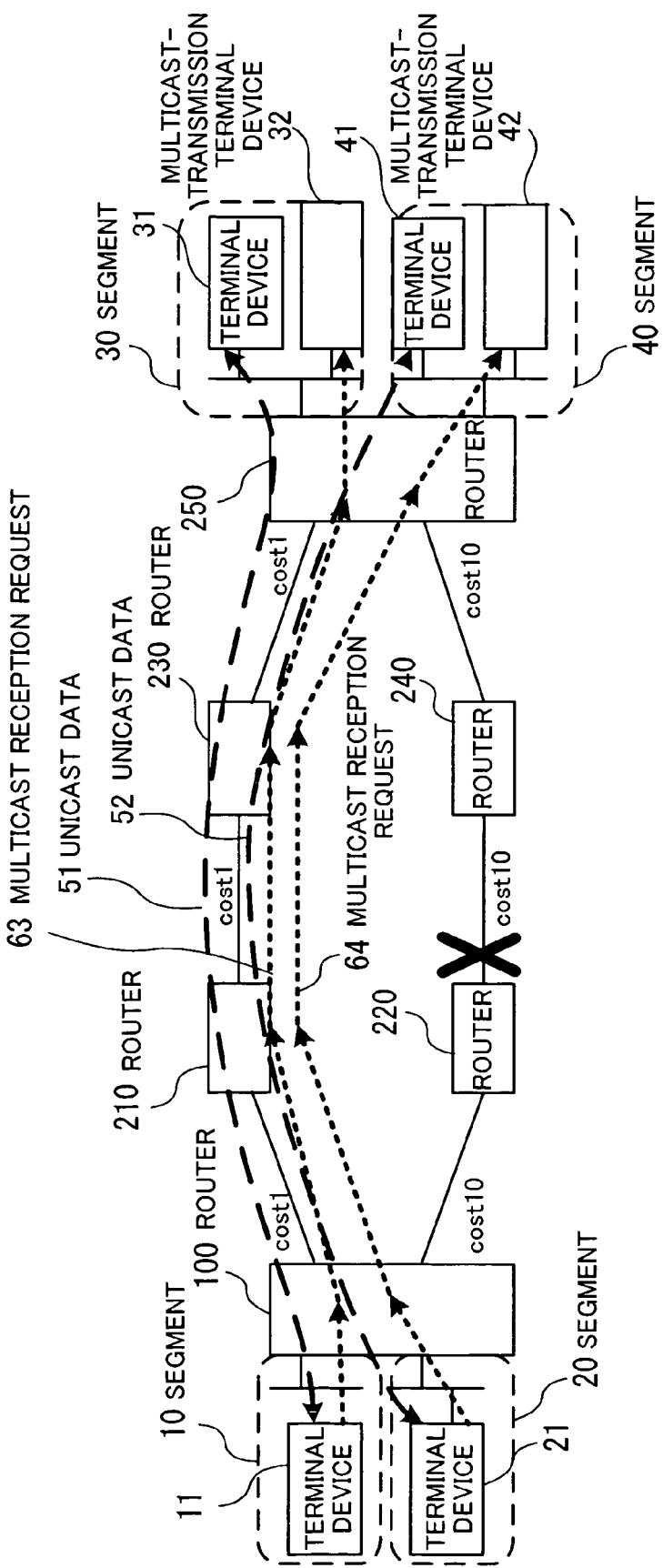
FIG. 14 is a diagram depicting a transmission line for multicast reception requests in the event of a failure.

FIG. 14 is a diagram depicting a transmission line for multicast reception requests in the event of a failure. If a line failure occurs between the router 220 and the router 240, the router 220 detects the line failure (a breakage of the link with the router 240). The router 220 then informs the router 100 that the link with the router 240 has broken, based on the routing protocol of unicast data.

In response, the router 100 changes to "DOWN" the state of the transmission line passing through the routers 220 and 240 in the static route management table 132*a*. Thereafter, when multicast reception requests 63 and 64 bound for the multicast-transmission terminal devices 32 and 42, respectively, are output from the terminal devices 11 and 21, respectively, the router 100 determines that the transmission line registered in the static route management table 132*a* is broken, and selects a transmission line in accordance with the routing protocol of unicast data.

As a result, the server 100 transmits the multicast reception requests 63 and 64 to the server 210. In the same manner, other servers 210, 230, and 250 relay the multicast reception requests 63 and 64 over the same transmission line as that for unicast data. Consequently, the multicast reception requests 63 and 64 are sent to the multicast-transmission terminal devices 32 and 42, respectively.

Subsequently, the multicast data transmitted from the multicast-transmission terminal devices 32 and 42 are transmitted in the opposite direction over the transmission line taken by the multicast reception requests 63 and 64.

Figure 15:
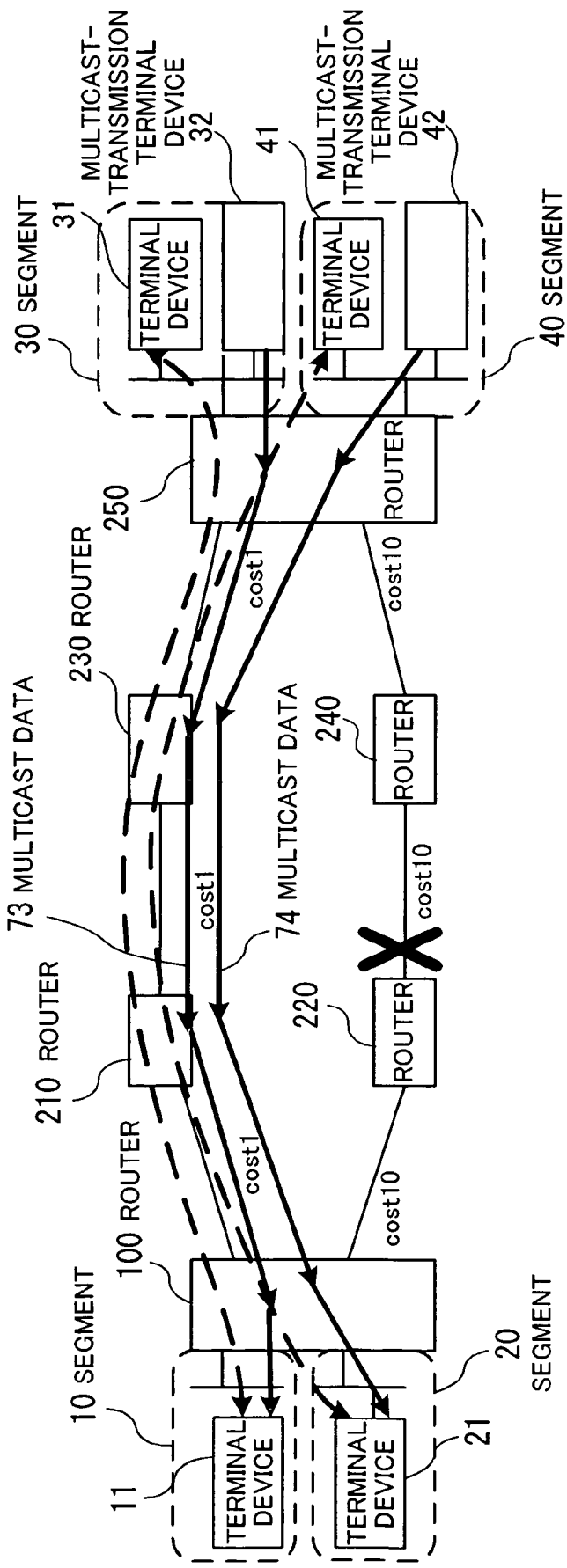
FIG. 15 is a diagram depicting a transmission line for multicast data after a failure occurs.

FIG. 15 is a diagram depicting a transmission line for multicast data after a failure occurs. Referring to FIG. 15, if a line failure occurs on a transmission line predetermined for the transmission of multicast data 73 and 74, the transmission line for the multicast data 73 and 74 is automatically changed.

In the examples shown in FIGS. 11 to 15, each server has a setting such that multicast data output by the two multicast-transmission terminal devices 32 and 42 is transmitted over the same transmission line. However, multicast data output by the two multicast-transmission terminal devices 32 and 42 can be transmitted over different transmission lines. For example, in the case of different types of multicast data having different characteristics, such as audio data and video data transmitted based on VoIP, different transmission lines may be used for such different multicast addresses. Even in this case, multicast data can be transmitted via a transmission line different from the preset transmission line in the event of a failure by implementing a multicast dynamic routing function in each router.

Figure 16:
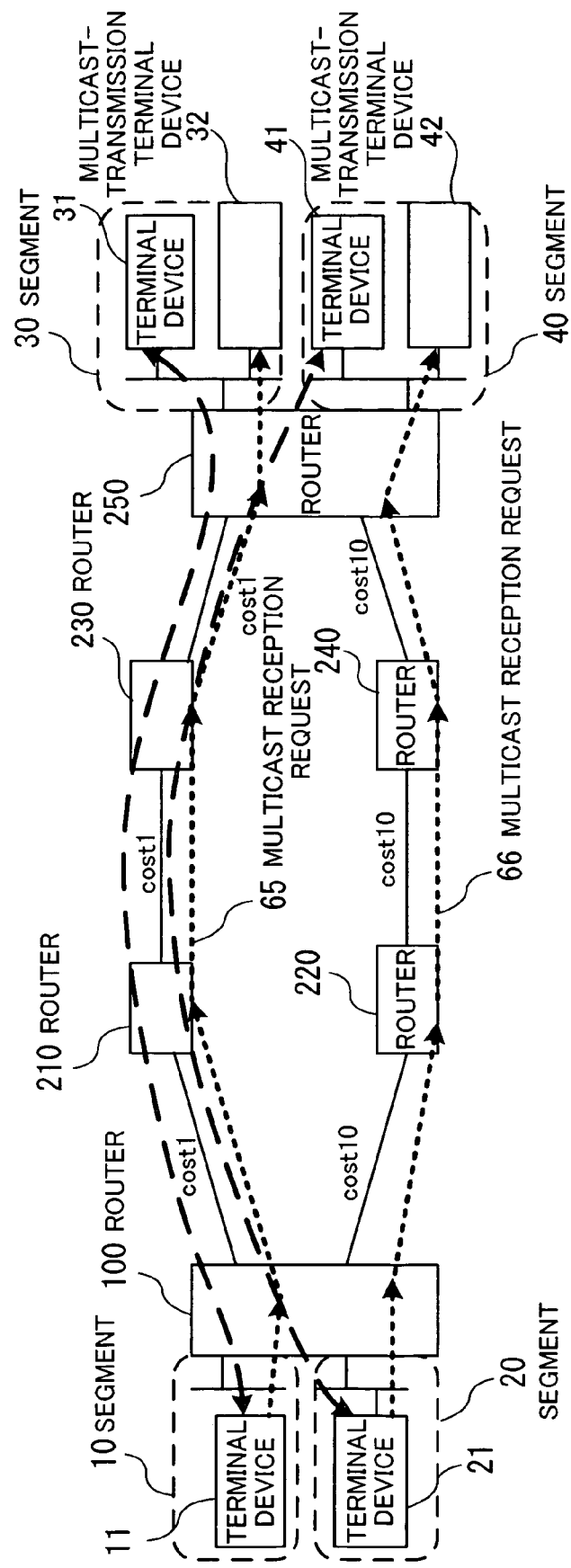
FIG. 16 is a diagram depicting transmission lines for multicast reception requests for distributing multicast data via different routes depending on the type of the multicast data.

FIG. 16 is a diagram depicting transmission lines for multicast reception requests for distributing multicast data via different routes depending on the type of the multicast data. In the example of FIG. 16, in the router 100, the router 210 is registered as a multicast-reception-request-transmission destination corresponding to the multicast address of the multicast-transmission terminal device 32. In the router 100, the router 220 is also registered as a multicast-reception-request-transmission destination corresponding to the multicast address of the multicast-transmission terminal device 42.

In the router 210, the router 230 is registered as a multicast-reception-request-transmission destination corresponding to the multicast address of the multicast-transmission terminal device 32. In the router 230, the router 250 is registered as a multicast-reception-request-transmission destination corresponding to the multicast address of the multicast-transmission terminal device 32.

In the router 220, the router 240 is registered as a multicast-reception-request-transmission destination corresponding to the multicast address of the multicast-transmission terminal device 42. Furthermore, in the router 240, the router 250 is registered as a multicast-reception-request-transmission destination corresponding to the multicast address of the multicast-transmission terminal device 42.

With these settings, a multicast reception request 65 output from the terminal device 11 towards the multicast-transmission terminal device 32 is transmitted to the multicast-transmission terminal device 32 via the routers 100, 210, 230, and 250. Furthermore, a multicast reception request 66 output from the terminal device 21 towards the multicast-transmission terminal device 42 is transmitted to the multicast-transmission terminal device 42 via the routers 100, 220, 240, and 250.

In this manner, multicast data output from the multicast-transmission terminal devices 32 and 42 are distributed over different transmission lines.

Figure 17:
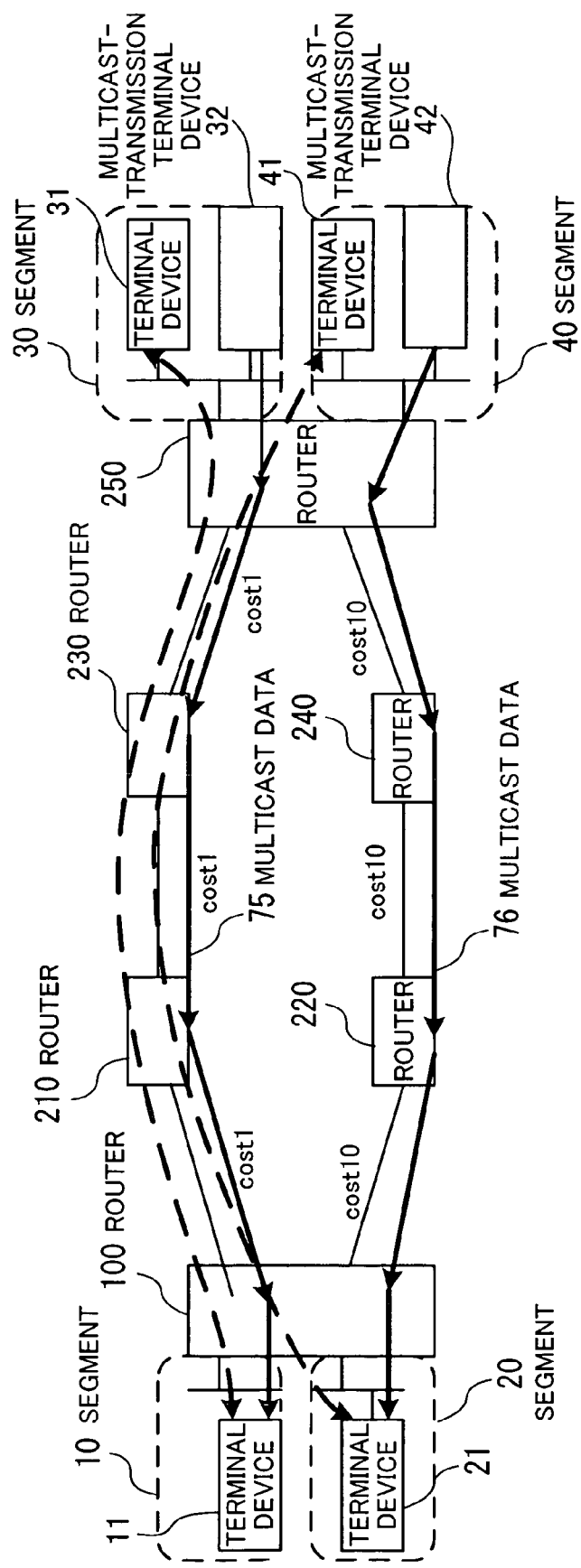
FIG. 17 is a diagram depicting transmission lines for multicast data to be distributed via different routes depending on the type of the multicast data.
Figure 18:
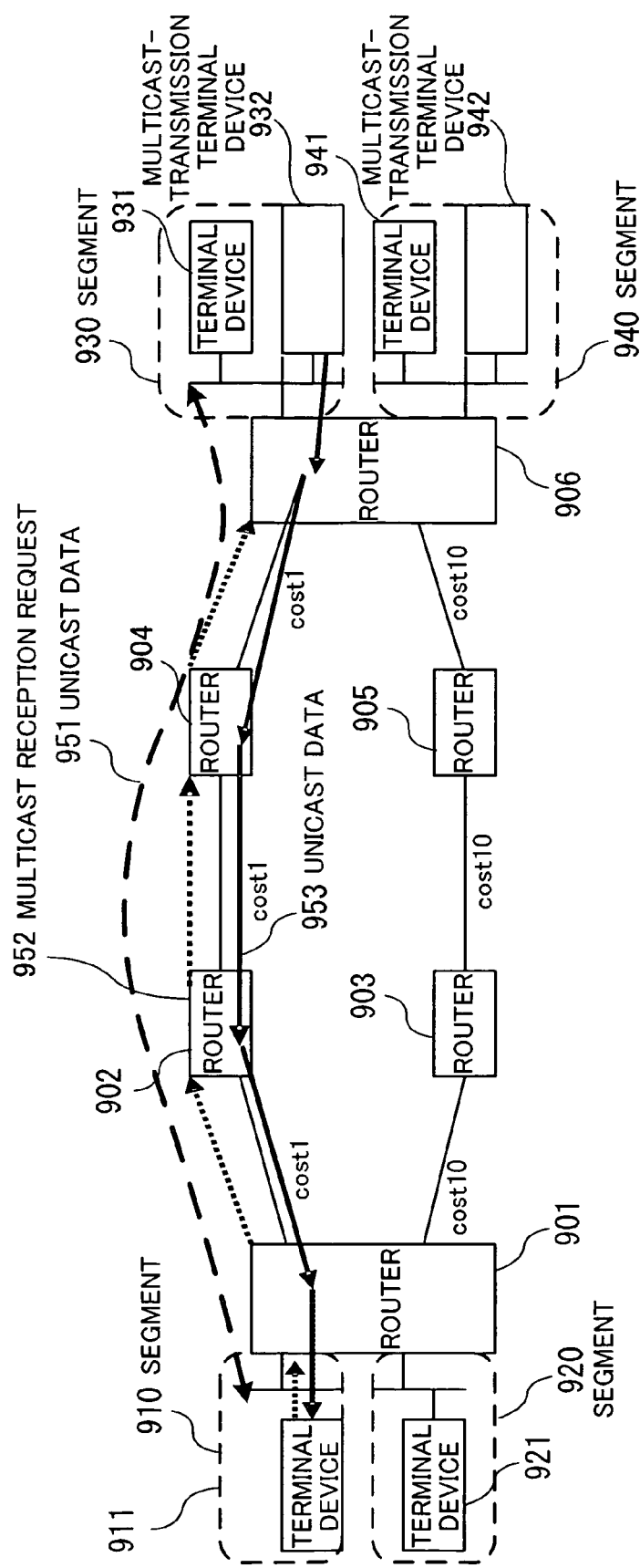
FIG. 18 is a diagram depicting a technology for transmitting multicast data by known dynamic routing.
Figure 19:
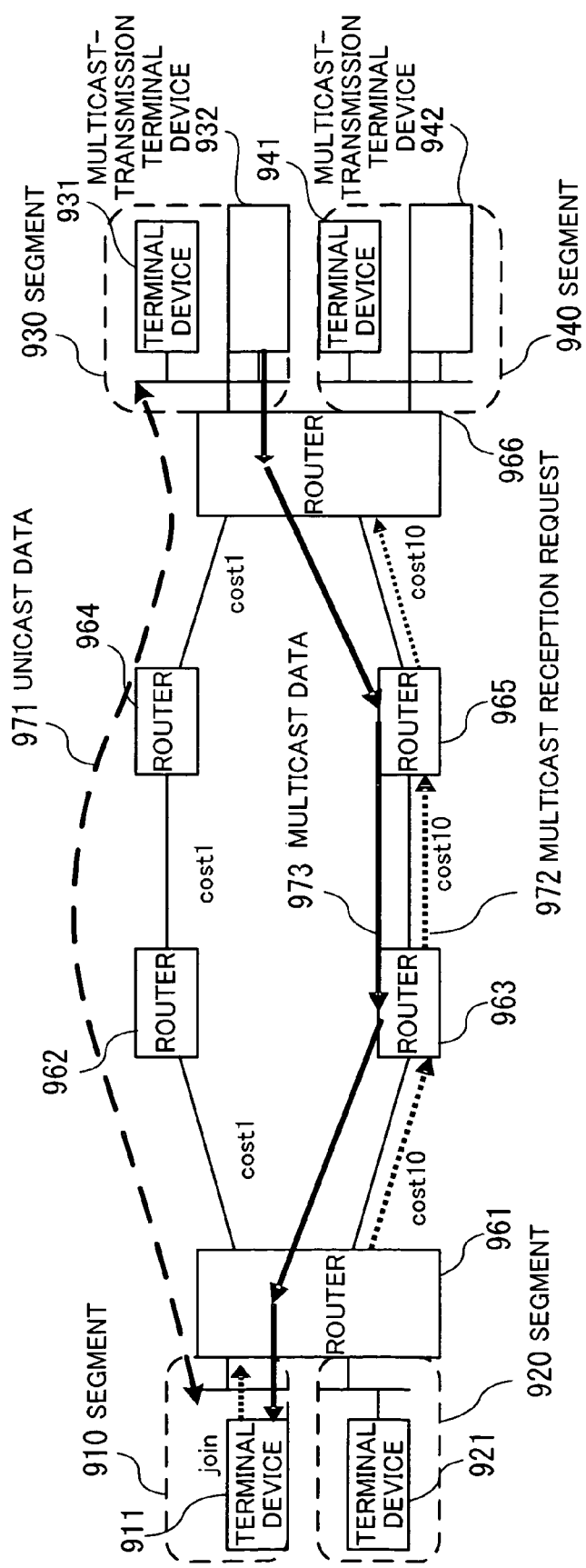
FIG. 19 is a diagram depicting a technology for transmitting multicast data by known static routing.

FIG. 17 is a diagram depicting transmission lines for multicast data to be distributed via different routes depending on the type of the multicast data. In the example of FIG. 17, multicast data 75 output from the multicast-transmission terminal device 32 is transmitted to the terminal device 11 via the routers 250, 230, 210, and 100. Furthermore, multicast data 76 output from the multicast-transmission terminal device 42 is transmitted to the terminal device 21 via the routers 250, 240, 220, and 100.

Under this condition, if a line failure occurs on the optical fiber between the routers 220 and 240, in other words, if the link between the routers 220 and 240 is broken, then the transmission line for the multicast data 76 output from the multicast-transmission terminal device 42 is changed. As a result, the multicast data 76 is transmitted over the same transmission line as that for the multicast data 75 shown in FIG. 15.

In this manner, if a line failure occurs on the transmission line for multicast data, the multicast data can be dynamically diverted to an alternative line.

The above-described processing function can be realized with a computer. For this purpose, a program for executing the processing function of a router is provided. The above-described processing function can be realized by executing the program on the computer. The program describing the processing function can be recorded on computer-readable recording media. The computer-readable recording media include magnetic recording apparatuses, optical discs, magneto-optical recording media, and semiconductor memories. The magnetic recording apparatuses include a hard disk apparatus (HDD), a flexible disk (FD), and a magnetic tape. The optical discs include a digital versatile disc (DVD), a digital versatile disc random access memory (DVD-RAM), a compact disc read only memory (CD-ROM), a compact disc recordable (CD-R), and a compact disc rewritable (CD-RW). The magneto-optical recording media include a magneto-optical disc (MO).

When the program is to be distributed, a portable recording medium having recorded the program, such as a DVD or a CD-ROM, is marketed, for example. Furthermore, the program can be stored in a storage device of a server computer to allow the program to be transferred to another computer from the server computer through a network.

A computer executing the program stores, for example, the program recorded in a portable recording medium or the program transferred from a server computer, in its storage device. The computer then reads out the program from its storage device, and executes the processing according to the program. The computer can read out the program directly from the portable recording medium to execute the processing according to the program. Furthermore, the computer can execute processing according to a program received each time the program is transferred from the server computer.

The present invention is not limited to the above-described embodiment. Various modifications can be made within the scope of the present invention.

According to the present invention, a multicast reception request is transmitted over a predetermined transmission line if all links on the predetermined transmission line are connected. In contrast, if there is at least one broken link on the predetermined transmission line, the multicast reception request is transmitted over a transmission line different from the predetermined transmission line. Subsequently, multicast data output from the multicast-transmission terminal device is transferred in the opposite direction over the path taken by the multicast reception request. In this manner, as long as communication via the predetermined transmission line is possible, the multicast data is distributed over the predetermined transmission line. If the predetermined transmission line is disconnected due to, for example, a failure, the transmission line for the multicast data is automatically switched to another communicable transmission line. As a result, multicast data distributed over a path different from that for unicast data can be made more reliable.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium having stored a multicast routing program for routing multicast data, the program causing a computer to function as:

link-monitoring means for monitoring a state of a link between devices connected to a network to set state information in a link state table;

predetermined-transmission-line managing means for referring to the link state table to set transmission-line-state information in a predetermined-transmission-line managing table including a predetermined transmission line leading to a multicast-transmission terminal device for distributing multicast data;

state-determining means for referring to the predetermined-transmission-line managing table to determine whether or not all the links on the predetermined transmission line leading to the multicast-transmission terminal device are connected, upon receiving a multicast reception request specifying the multicast-transmission terminal device; and multicast-reception-request transmitting means for transmitting the multicast reception request to an adjacent router on the predetermined transmission line if all the links on the predetermined transmission line are connected, and for selecting one transmission line on which all links leading to the multicast-transmission terminal device are connected to transmit the multicast reception request through the selected transmission line.

2. The computer-readable recording medium according to claim 1, wherein the multicast routing program further causing a computer to function as:

multicast-data transferring means for registering identification information of a communication interface to which the multicast reception request is input, in a multicast routing table and, upon receiving multicast data output from the multicast-transmission terminal device, for referring to the multicast routing table to transmit the multicast data from the communication interface to which the multicast reception request is input.

3. The computer-readable recording medium according to claim 1, wherein the state information indicates whether the link is in a connection state or a disconnection state.

4. The computer-readable recording medium according to claim 1, wherein the transmission-line-state information indicates whether or not all links on the predetermined transmission line are in a connection state.

5. The computer-readable recording medium according to claim 1, wherein the multicast-reception-request transmitting means selecting one transmission line on which all links leading to the multicast-transmission terminal device are connected to transmit the multicast reception request through the selected transmission line if a link is disconnected on the predetermined transmission line.

6. A multicast routing method for routing multicast data using a computer, the method comprising the steps of:
monitoring a state of a link between devices connected to a network to set state information in a link state table, the state information indicating whether the link is in a connection state or a disconnection state;
referring to the link sate table to set transmission-line-state information in a predetermined-transmission-line managing table including a predetermined transmission line leading to a multicast-transmission terminal device for distributing multicast data, the transmission-line-state information indicating whether or not all links on the predetermined transmission line are in a connection state;
referring to the predetermined-transmission-line managing table to determine whether or not all the links on the predetermined transmission line leading to the multicast-transmission terminal device are connected, upon receiving a multicast reception request specifying the multicast-transmission terminal device;
transmitting the multicast reception request to an adjacent router on the predetermined transmission line if all the links on the predetermined transmission line are connected, and selecting one transmission line on which all links leading to the multicast-transmission terminal device are connected to transmit the multicast reception request through the selected transmission line if a link is disconnected on the predetermined transmission line; and
registering identification information of a communication interface to which the multicast reception request is input, in a multicast routing table and, upon receiving multicast data output from the multicast-transmission terminal device, referring to the multicast routing table to transmit the multicast data from the communication interface to which the multicast reception request is input.

7. A multicast router for routing multicast data, comprising:
link-monitoring means for monitoring a state of a link between devices connected to a network to set state information in a link state table;
predetermined-transmission-line managing means for referring to the link state table to set transmission-line-state information in a predetermined-transmission-line managing table including a predetermined transmission line leading to a multicast-transmission terminal device for disturbing multicast data;
state-determining means for referring to the predetermined-transmission-line managing table to determine whether or not all the links on the predetermined transmission line leading to the multicast-transmission terminal device are connected, upon receiving a multicast reception request specifying the multicast-transmission terminal device; and
multicast-reception-request transmitting means for transmitting the multicast reception request to an adjacent router on the predetermined transmission line if all the links on the predetermined transmission line are connected, and for selecting one transmission line on which all links leading to the multicast-transmission terminal device are connected to transmit the multicast reception request through the selected transmission line.

8. The multicast router according to claim 7, further comprising:
multicast-data transferring means for registering identification information of a communication interface to which the multicast reception request is input, in a multicast routing table and, upon receiving multicast data output from the multicast-transmission terminal device, for referring to the multicast routing table to transmit the multicast data form the communication interface to which the multicast reception request is input.

9. The multicast router according to claim 7, wherein the state information indicates whether the link is in a connection state or a disconnection state.

10. The multicast router according to claim 7, wherein the transmission-line-state information indicates whether or not all links on the predetermined transmission line are in a connection state.

11. The multicast router according to claim 7, wherein the multicast-reception-request transmitting means selecting one transmission line on which all links leading to the multicast-transmission terminal device are connected to transmit the multicast reception request through the selected transmission line if a link is disconnected on the predetermined transmission line.

12. A computer-readable recording medium having stored a multicast routing program for routing multicast data, the program causing a computer to function as:
link-managing means for monitoring a state of a link between devices connected to a network to set state information in a link state table, the state information indicating whether the link is in a connection state or a disconnection state;
predetermined-transmission-line managing means for referring to the link state table to set transmission-line-state information in a predetermined-transmission-line managing table including a predetermined transmission line leading to a multicast-transmission terminal device for distributing multicast data, the transmission-line-state information indicating whether or not all links on the predetermined transmission line are in a connection state;
state-determining means for referring to the predetermined-transmission-line managing table to determine whether or not all the links on the predetermined transmission line leading to the multicast-transmission terminal device are connected, upon receiving a multicast reception request specifying the multicast-transmission terminal device;
multicast-reception-request transmitting means for transmitting the multicast reception request to an adjacent router on the predetermined transmission line if all the links on the predetermined transmission line are connecter, and for selecting one transmission line on which all links leading to the multicast-transmission terminal device are connected to transmit the multicast reception request through the selected transmission line if a link is disconnected on the predetermined transmission line; and
multicast-data transferring means for registering identification information of a communication interface to which the multicast reception request is input, in a multicast routing table and, upon receiving multicast data output from the multicast-transmission terminal device, for referring to the multicast routing table to transmit the multicast data form the communication interface to which the multicast reception request is input.

13. The computer-readable recording medium according to claim 12, wherein, if a link is disconnected on the predetermined transmission line, the multicast-reception-request transmitting means refers to a routing table for unicast data to select one transmission line on which all links leading to the multicast-transmission terminal device are connected.

14. The computer-readable recording medium according to claim 12, wherein the link-managing means sets state information of a link between devices in the link state table, the link being associated with an identification number for uniquely identifying the link;

the predetermined-transmission-line managing table includes an identification number for identifying each of the links included in the predetermined transmission line, the identification number being associated with a multicast address of the multicast-transmission terminal device; and the predetermined-transmission-line managing means refers to the link state table and checks the link state of the link corresponding to each identification number registered in the predetermined-transmission-line managing table to determine the connection state of the predetermined line.

15. The computer-readable recording medium according to claim 12, wherein the predetermined-transmission-line managing table includes a predetermined transmission line leading to each multicast-transmission terminal device of a plurality of multicast-transmission terminal devices, the predetermined transmission line being associated with an address of the each multicast-transmission terminal device.

* * * * *